(12) United States Patent
Voelker et al.

(10) Patent No.: US 11,593,338 B2
(45) Date of Patent: Feb. 28, 2023

(54) COMPUTER-IMPLEMENTED METHOD FOR DATABASE MANAGEMENT, COMPUTER PROGRAM PRODUCT AND DATABASE SYSTEM

(71) Applicant: SAP SE, Walldorf (DE)

(72) Inventors: Patrick Voelker, Mannheim (DE); Alexander Boehm, Schwetzingen (DE); Mihnea Andrei, Issy les Moulineaux (FR); Johannes Alberti, San Ramon, CA (US)

(73) Assignee: SAP SE, Walldorf (DE)

( * ) Notice: Subject to any disclaimer, the term of this patent is extended or adjusted under 35 U.S.C. 154(b) by 51 days.

(21) Appl. No.: 17/410,234

(22) Filed: Aug. 24, 2021

(65) Prior Publication Data

US 2023/0004541 A1 Jan. 5, 2023

(30) Foreign Application Priority Data

Jun. 30, 2021 (EP) .................................... 21182689

(51) Int. Cl.
*G06F 16/22* (2019.01)
*G06F 16/23* (2019.01)
*G06F 16/21* (2019.01)
*G06F 16/25* (2019.01)
*G06F 11/14* (2006.01)

(52) U.S. Cl.
CPC ...... *G06F 16/2219* (2019.01); *G06F 11/1453* (2013.01); *G06F 16/219* (2019.01); *G06F 16/2358* (2019.01); *G06F 16/256* (2019.01)

(58) Field of Classification Search
CPC combination set(s) only.
See application file for complete search history.

(56) References Cited

U.S. PATENT DOCUMENTS

2012/0310934 A1\* 12/2012 Peh ........................ G06F 16/219
707/736
2019/0325532 A1\* 10/2019 Torrenegra .......... G06F 16/9535

\* cited by examiner

*Primary Examiner* — Loc Tran
(74) *Attorney, Agent, or Firm* — Buckley, Maschoff & Talwalkar LLC

(57) ABSTRACT

A computer-implemented method for database management is provided. The method comprises: receiving, from a client device, first data to be stored in a database system that comprises first data storage configured to store a data table and a deletion history table; storing the first data in second data storage that is external to the database system and that is in communication with the database system via a network; obtaining a link that enables access, via the network, to the first data stored in the second data storage; storing the link in the data table; and performing a deletion operation of the first data, in response to a request from the client device to delete the first data from the database system, wherein the deletion operation comprises: deleting the link from the data table without deleting the first data from the second data storage; and storing the link in the deletion history table with a timestamp corresponding to a point in time when the link is deleted from the data table.

20 Claims, 11 Drawing Sheets

COMPUTER-IMPLEMENTED METHOD FOR DATABASE MANAGEMENT, COMPUTER PROGRAM PRODUCT AND DATABASE SYSTEM

CROSS-REFERENCE TO RELATED APPLICATIONS

This application claims priority to European Publication No. 21182689.6, filed Jun. 30, 2021, the contents of which are incorporated by reference herein for all purposes.

BACKGROUND

A database may store different types and sizes of data. For example, some data stored in a database may include merely a numerical value and/or text data indicating a piece of information. Other data stored in a database may include large object data containing, for instance, image, audio and/or video data, which often has a larger data size compared to a mere numerical value or text data.

In some circumstances, storing and managing different types and sizes of data in relational data tables in a relational database may undermine performance of the database. Further, depending on the size and access frequency of data with different types, using the database for all kinds of data in the same manner may lead to suboptimal costs. Further, as the amount of data stored in a database increases, the size of backup files for the database may also increase. This may lead to increase of costs and/or time for related database maintenance operations (e.g., backup/restore).

SUMMARY

According to an aspect, the problem relates to enabling efficient usage of data storage for a database system, while ensuring data integrity and data consistency.

The problem is solved by the features disclosed by the independent claims. Further exemplary embodiments are defined by the dependent claims.

According to an aspect, a computer-implemented method for database management is provided. The method comprises:
  receiving, from a client device, first data to be stored in a database system that comprises first data storage configured to store a data table and a deletion history table;
  storing the first data in second data storage that is external to the database system and that is in communication with the database system via a network;
  obtaining a link that enables access, via the network, to the first data stored in the second data storage;
  storing the link in the data table; and
  performing a deletion operation of the first data, in response to a request from the client device to delete the first data from the database system,
  wherein the deletion operation comprises:
    deleting the link from the data table without deleting the first data from the second data storage; and
    storing the link in the deletion history table with a timestamp corresponding to a point in time when the link is deleted from the data table.

In the present disclosure, the "link" to data may be understood as information that defines a location of the data on the network, thereby enabling access to the data. In some exemplary embodiments, the "link" may include a uniform resource identifier (URI) of the data. In some circumstances, the "link" may include a compressed version of the URI of the data for more efficient storage in database tables. In the present disclosure, the "link" may also be referred to as a "datalink".

Further, in the present disclosure, the "data table" may be a relational table comprising rows and columns. Each row may correspond to an object, data relating to which is stored in the data table. Each column may correspond to an attribute of objects. Further, in the present disclosure, an "item" of the data table may refer to data stored in a specific column of a specific row of the data table.

In various aspects and embodiments described herein, the "deletion history table" may include information indicating a link of which first data was deleted from the data table in which point in time. In some exemplary embodiments, the deletion history table may include identification information of the first data, the deleted link to the first data and the timestamp of the deletion. The identification information of the first data may include, for example, information identifying the row and column of the data table in which the link to the first data was stored.

According to various aspects and embodiments described herein, the first data is stored in the second data storage that is external to the database system and only the link to the first data stored in the second data storage is stored in the data table in the first data storage comprised in the database system. This can increase storage capacity of the first data storage, which may be particularly advantageous in case, for example, the first data storage provides higher performance (e.g., faster access to data) and, thus, is more expensive, than the second data storage.

Further, according to various aspects and embodiments described herein, when a request is made to delete the first data from the database system, the link to the first data stored in the second data storage is deleted from the data table in the first data storage without deleting the first data from the second data storage and the deleted link is stored in the deletion history table. In other words, the first data is maintained in the second data storage and the link to the first data is recorded in the deletion history table. This may ensure data integrity and enable multi-version concurrency control, which can lead to ensuring data consistency. Moreover, deleting the link to the first data stored in the second data storage from the data table in the first data storage without deleting the first data from the second data storage may require no interaction with the second data storage during the deletion operation. In other words, the deletion operation can be performed with accessing only the first data storage. Thus, the deletion operation may be faster than in case of deleting the first data itself from the second data storage. In addition, concurrent operations may still be able to retrieve the first data from the second data storage, therefore preserving the isolation requirements of a DBMS (database management system) as mandated by the ACID (atomicity, consistency, isolation, durability) principles.

The method according to the above-stated aspect may further comprise:
  receiving updated first data from the client device;
  storing the updated first data in the second data storage;
  obtaining an updated link that enables access, via the network, to the updated
  first data stored in the second data storage;
  storing the updated link in the data table; and
  performing the deletion operation of the first data.

As stated above, in the deletion operation of the first data, the first data is not deleted from the second data storage and the link to the ("deleted") first data is stored in the deletion history table. Accordingly, also when the first data is updated, the first data before the update may be kept in the second data storage and the link to the first data before the update may be stored in the deletion history table. This can ensure data integrity and data consistency, also with respect to updates of the first data and/or in case of data recovery. Further, for example, even in case multiple users concurrently access the database system, the operations instructed by the multiple users may still be able to retrieve the first data from the second data storage, therefore preserving the isolation requirements of a DBMS as mandated by the ACID principles.

In some exemplary embodiments, the method according to the above-stated aspect may further comprise:
  receiving second data including data relating to the first data; and
  storing, in association with the first data, the second data in the data table,
  wherein a data size of the second data is smaller than a specified threshold value and a data size of the first data is equal to or larger than the specified threshold value.

For example, the first data and the second data may be received as data items to be stored in a same row in the data table stored in the first data storage. In such a case, the row of the data table in the first data storage may contain the second data itself and the link to the first data stored in the second data storage.

Further, in some exemplary embodiments, the method according to the above-stated aspect may further comprise:
  receiving a data item to be stored in the database system;
  in case a size of the received data item is equal to or larger than a specified threshold value,
    storing the received data item in the second data storage as the first data,
    obtaining and storing in the data table a link that enables access, via the network, to the received data item stored in the second data storage as the first data; and
  in case a size of the received data item is less than the specified threshold value, storing the received data item in the data table.

In some exemplary embodiments, the first data may include binary large object (BLOB) data. Further, the link may be stored in a column of the data table, where the column is assigned to a remote BLOB (RBLOB) data type.

In the present disclosure, the "BLOB" may be understood as a collection of binary data stored as a single entity. BLOB data may include, for example, image data, audio data, video data, a combination of image data, audio data, video data and/or text data, binary executable code, etc.

Further, in some exemplary embodiments, the first data storage may comprise a main memory and at least one disk storage device. In such exemplary embodiments, the database system comprising the first data storage may be understood as an in-memory database system that primarily relies on main memory for computer data storage. An example of an in-memory database system may be SAP HANA, e.g., as described in "The SAP HANA Database—An Architecture Overview", Franz Färber, et al., 2012.

Further, in some exemplary embodiments, the second data storage may comprise cloud storage. The cloud storage may be implemented with cloud computing that is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud computing environment may have one or more of the following characteristics: multi-tenancy, performance monitoring, virtual resources that are dynamically assignable to different users according to demand, multiple redundant sites, multiple virtual machines, network accessibility (e.g., via. the Internet) from multiple locations (e.g., via a web browser) and devices (e.g., mobile device or PC).

The cloud storage may be provided by a cloud computing service provider. Examples of cloud storage services may include, but are not limited to, Amazon S3 provided by Amazon, Azur Blob Storage provided by Microsoft, Azure Data Lake provided by Microsoft, Google Cloud Storage provided by Google, etc.

Further, in some exemplary embodiments, the method according to the above-stated aspect further comprises:
  deleting the first data from the second data storage based on:
    a specified maximum retention time of backup data for the database system, and
    the timestamp of the link stored in the deletion history table.

In various embodiments and examples described herein, the "specified maximum retention time" may be input to the database system by a user. In other words, the user may specify the maximum retention time of backup data for the database system.

Deleting the first data from the second data storage as stated above can promote efficient usage of resources in the second data storage, since the first data that is no longer used by the database system can be deleted from the second data storage.

According to another aspect, a computer program product is provided. The computer program product comprises computer-readable instructions, which, when loaded and executed on a computing system, cause the computing system to perform the method according to any one of the above-stated aspect and exemplary embodiments.

According to yet another aspect, a database system is provided. The database system comprises:
  at least one processor; and
  first data storage that is coupled to the at least one processor and that is configured to store a data table and a deletion history table,
  wherein the at least one processor is configured to:
    receive, from a client device, first data to be stored in the database system;
    store the first data in second data storage that is external to the database system and that is in communication with the at least one processor via a network;
    obtain a link that enables access, via the network, to the first data stored in the second data storage;
    store the link in the data table; and
    perform a deletion operation of the first data, in response to a request from the client device to delete the first data from the database system,
  wherein the deletion operation comprises:
    deleting the link from the data table without deleting the first data from the second data storage; and
    storing the link in the deletion history table with a timestamp corresponding to a point in time when the link is deleted from the data table.

In some exemplary embodiments, the at least one processor may be further configured to:
  receive updated first data from the client device;
  store the updated first data in the second data storage;

obtain an updated link that enables access, via the network, to the updated first data stored in the second data storage;

store the updated link in the data table; and perform the deletion operation of the first data.

Further, in some exemplary embodiments, the at least one processor may be further configured to:

receive second data including data relating to the first data; and store, in association with the first data, the second data in the data table, wherein a data size of the second data is smaller than a specified threshold value and a data size of the first data is equal to or larger than the specified threshold value.

In some exemplary embodiments, the second data may comprise one or more numerical values and/or text data.

Further, in some exemplary embodiments, the at least one processor may be further configured to:

receive a data item to be stored in the database system;

in case a size of the received data item is equal to or larger than a specified threshold value, store the received data item in the second data storage as the first data, obtain and store in the data table a link that enables access, via the network, to the received data item stored in the second data storage as the first data; and in case a size of the received data item is less than the specified threshold value, store the received data item in the data table.

In the database system according to any one of the above-stated aspect and exemplary embodiments, the first data may include BLOB data. Further, the link may be stored in a column of the data table, the column being assigned to a remote BLOB data type.

In the database system according to any one of the above-stated aspect and exemplary embodiments, the first data storage may comprise a main memory and at least one disk storage device. Further, the second data storage may comprise cloud storage.

Further, in some exemplary embodiments, the at least one processor may be further configured to:

delete the first data from the second data storage based on:

a specified maximum retention time of backup data for the database system, and the timestamp of the link stored in the deletion history table.

The subject matter described in the application can be implemented as a method or as a system, possibly in the form of one or more computer program products. The subject matter described in the application can be implemented in a data signal or on a machine readable medium, where the medium is embodied in one or more information carriers, such as a CD-ROM, a DVD-ROM, a semiconductor memory, or a hard disk. Such computer program products may cause a data processing apparatus to perform one or more operations described in the application.

In addition, subject matter described in the application can also be implemented as a system including a processor, and a memory coupled to the processor. The memory may encode one or more programs to cause the processor to perform one or more of the methods described in the application. Further subject matter described in the application can be implemented using various machines.

BRIEF DESCRIPTION OF THE DRAWINGS

Details of one or more implementations are set forth in the exemplary drawings and description below. Other features will be apparent from the description, the drawings, and from the claims. It should be understood, however, that even though embodiments are separately described, single features of different embodiments may be combined to further embodiments.

DETAILED DESCRIPTION

In the following text, a detailed description of examples will be given with reference to the drawings. It should be understood that various modifications to the examples may be made. In particular, one or more elements of one example may be combined and used in other examples to form new examples.

In-memory databases have been employed in applications where response time is critical. An in-memory database is a database management system that primarily relies on main memory for computer data storage. As compared to database management systems based on a disk storage mechanism, an in-memory database often provides faster access to data.

Accordingly, the term "in-memory" may mean that data stored in a database is available and stored in main memory, which avoids the performance penalty of disk I/O or network access. Main memory may be directly accessible by one or more CPUs of a computer system, and is sometimes implemented as volatile memory, such as random access memory (RAM) or cache memory. Further, data and/or code (e.g., library functions) may also be stored in main memory in order to facilitate parallelization. Either magnetic disk or solid state drives may be used for permanent persistency, e.g., in case of a power failure or some other catastrophe. An in-memory database may support both row and column storage and may be optimized for column storage (column oriented or columnar), e.g., via dictionary compression. Use of dictionary compression may reduce the number and/or size of database indices and enable data to be loaded into the cache of a processor faster.

Figure 1:
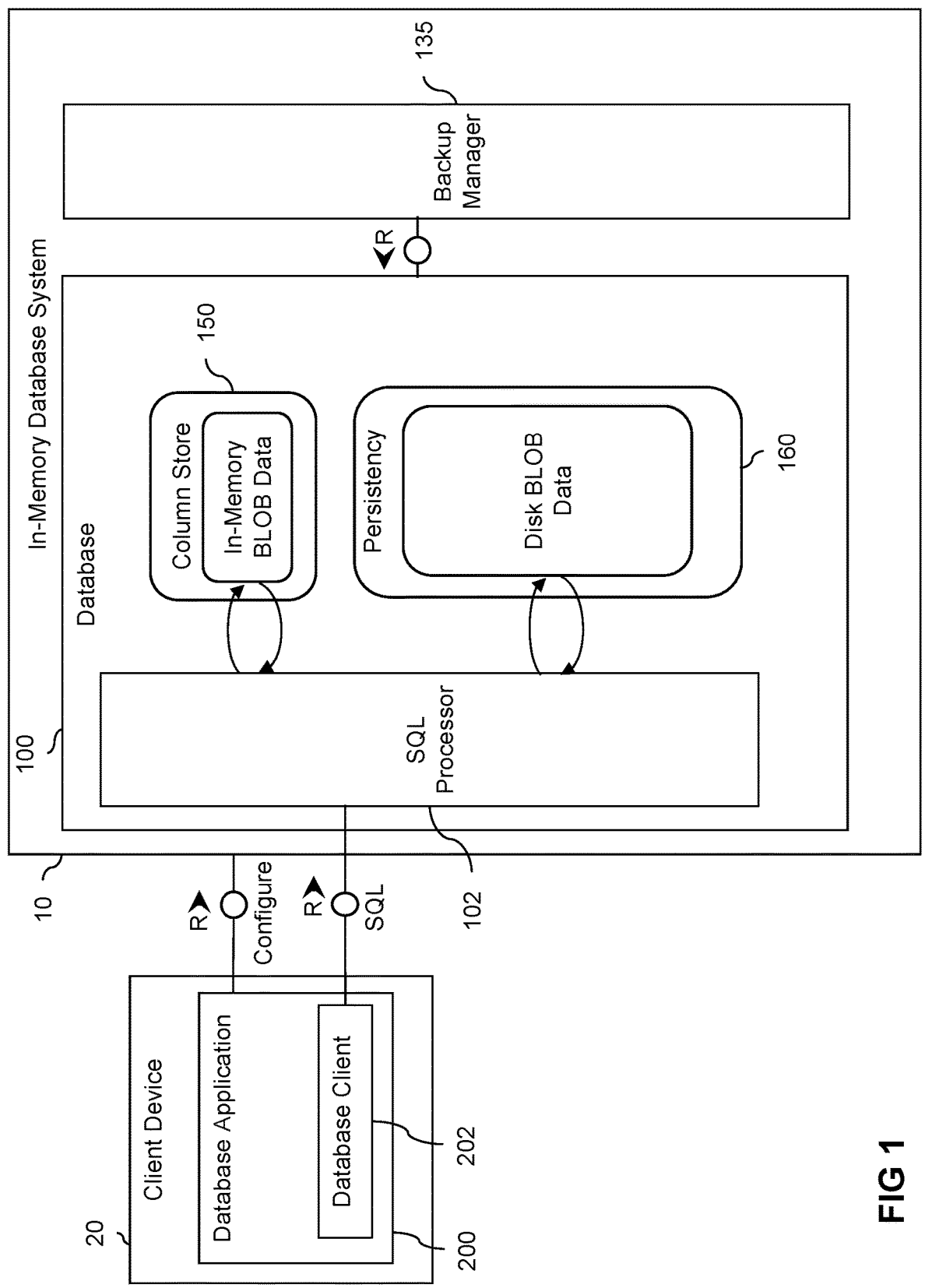
FIG. 1 shows a functional block diagram of an exemplary database system comprising an in-memory database.

FIG. 1 shows a functional block diagram of an exemplary database system comprising an in-memory database.

Referring to FIG. 1, an in-memory database system 10 may comprise a database 100 and a backup manager 135. The in-memory database system 10 may support transactions having one or more of the following properties: atomicity, consistency, isolation, durability (ACID).

The database 100 may comprise an SQL (Structured Query Language) processor 102, column store 150 and persistency 160.

The SQL processor 102 may be configured to receive, from a client device 20, instructions specifying SQL operations and perform the specified SQL operations on data stored in the database 100.

The column store 150 may be data storage implemented on main memory. The column store 150 may include in-memory BLOB data (in other words, BLOB data stored in the main memory), for example.

The persistency 160 may be data storage implemented on magnetic disk or solid state drives. The persistency 160 may include disk BLOB data (in other words, BLOB data stored in a disk storage device), for example.

The backup manager 135 may be configured to manage backups of the database 100. For example, the backup manager 135 may create snapshots of the data stored in the database 100, periodically and/or at specified points in time. The backup manager 135 may use the snapshots to restore the data stored in the database 100 at a particular point in time, which is specified by the user, for example.

The client device 20 may be in communication with the in-memory database system 10 and allow a user to instruct operations of data stored in the database 100. The client device 20 may be implemented by a computing device such as a personal computer, a laptop computer, a tablet computer, a mobile device such as a mobile phone (e.g. smartphone) etc. A database application 200 may be installed on the client device 20. The database application 200 may be an application that enables a user to configure and operate the in-memory database system 10. The database application 200 may comprise a database client 202 that communicates with the SQL processor 102 of the database 100.

Figure 2:
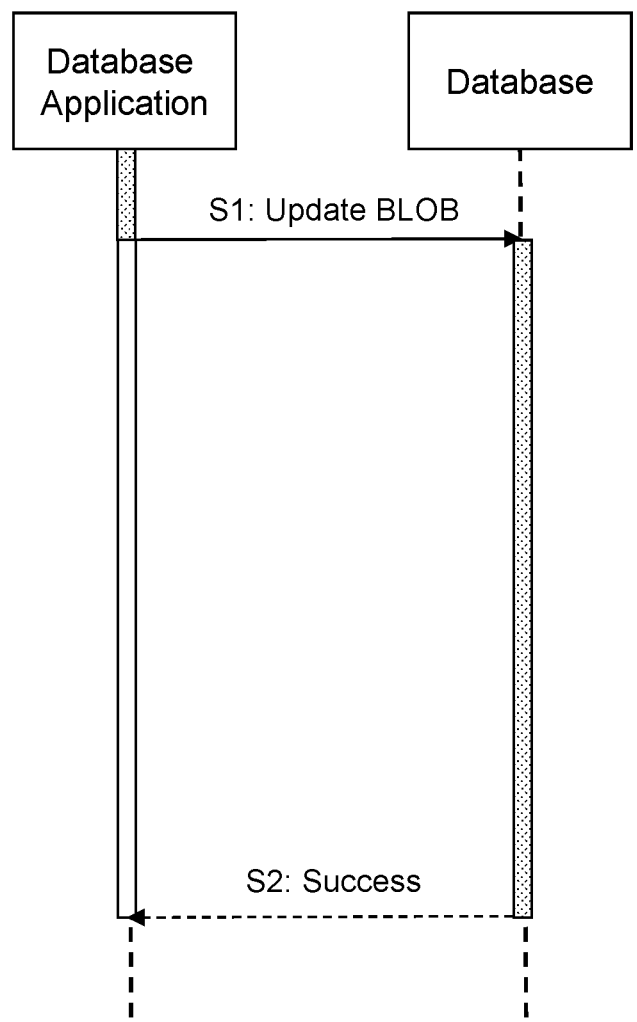
FIG. 2 shows a sequence diagram of an exemplary process for updating data in the exemplary database system shown in FIG. 1.

The database application 200 and the database 100 may interact with each other to perform operations on data stored in the database 100. As an exemplary operation, FIG. 2 shows a sequence diagram of an exemplary process for updating data in the exemplary database system shown in FIG. 1. Referring to FIG. 2, the database application 200 may send, to the database 100, a request to update BLOB data stored in the database 100 (step S1). The request may include the content of the updated BLOB data. In response, the database 100 may update the BLOB data and return, to the database application 20, a message indicating a successful update (step S2).

When storing data in the database 100, the data may be stored in the column store 150, as long as the column store 150 has sufficient space for the data. In some examples, a size threshold (e.g., a few kB) for data which can be stored as a single item in the column store 150 may be specified. In such examples, data within the size threshold may be stored in the column store 150 and data larger than the size threshold may be stored in the persistency 160.

As a specific example, large object data (such as image, audio, video, multimedia data etc.) may be stored in relational tables in the data base 100 using a specific data type, BLOB. All items stored in a column with the data type "BLOB" having data sizes exceeding a specified size threshold (e.g., 1 kB) may be held in the persistency 160 instead of the column store 150. This may reduce main memory storage costs, on the one hand, but on the other hand, may increase access latency. Although such disk-based performance is often accepted by users, considering the required high-performance disks underlying in-memory database installations and several operational concerns (e.g., impact of LOBs for system restart, size of backup files containing all LOB data, costs for high-performance storage devices, etc.), further improvements may be desirable.

Accordingly, as will be described below, various aspects and embodiments described herein can provide improved usage of data storage for a database system.

System Architecture

Figure 3:
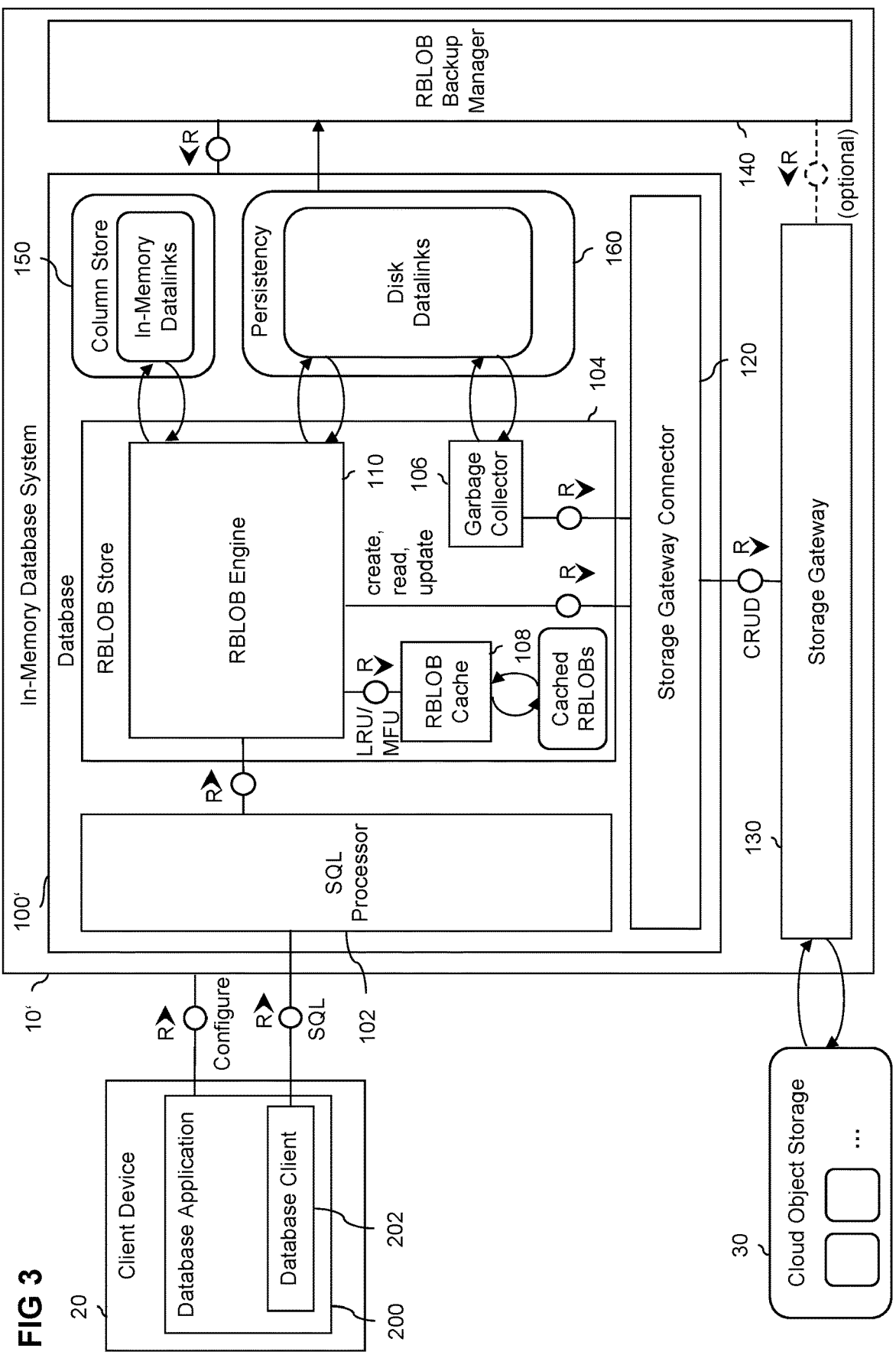
FIG. 3 shows a functional block diagram of an exemplary database system according to the present disclosure.

FIG. 3 shows a functional block diagram of an exemplary database system according to the present disclosure. In FIG. 3, elements that are identical to those shown in FIG. 1 are assigned identical reference signs and detailed explanations thereof are not repeated.

Referring to FIG. 3, an in-memory database system 10' may be in communication not only with the client device 20 but also with cloud object storage 30. The cloud object storage 30 may be considered as an example of the "second data storage" (e.g., more specifically, the "cloud storage" comprised in the "second data storage") of the present disclosure. The in-memory database system 10' may access the cloud object storage 30 via a network such as the Internet. The cloud object storage 30 may comprise one or more cloud storage services provided by different providers such as Amazon, Microsoft, Google, etc. At least some data to be stored in the in-memory database system 10' can be stored in the cloud object storage 30.

The in-memory database system 10' may comprise a database 100', a storage gateway 130 and an RBLOB backup manager 140.

The database 100' may comprise an SQL processor 102, an RBLOB store 104, a storage gateway connector 120, a column store 150 and a persistency 160. The SQL processor 102, the column store 150 and the persistency 160 may have the same functions as those shown in FIG. 1.

It is noted that the column store 150 and the persistency 160 may be considered as the "first data storage" in the present disclosure. The column store 150 and/or the persistency 160 may store a data table (not shown) and a deletion history table (not shown). The data table may be a relational table for the data stored and managed by the in-memory database system 10'. The deletion history table may store history of data items which are deleted from the data table, in particular, deleted datalinks to data stored in the cloud object storage 30 with timestamps corresponding to points in time when the respective datalinks were deleted from the data table.

The RBLOB store 104 may be configured to process data to be stored (or data already stored) in the cloud object storage 30. In some exemplary embodiments, BLOB data (e.g., an example of the "first data" in the present disclosure) may be processed by the RBLOB store 104 and stored in the cloud object storage 30. Further, a datalink to the BLOB data stored in the cloud object storage 30 may be stored in the column store 150 or the persistency 160. The BLOB data may be specified in the data table as a "remote BLOB (RBLOB)" data type that may be selected during table creation or defined for existing tables using DDL (data definition language) statements. For example, a column having the RBLOB data type may be provided in the data table and data items stored in RBLOB columns may be handled by the RBLOB store 104.

The RBLOB store 104 may comprise an RBLOB engine 110, a garbage collector 106 and an RBLOB cache 108.

The RBLOB engine 110 may be configured to perform operations (e.g., create, read, update, delete, etc.) concerning the data stored (or to be stored) in the cloud object storage 30. For example, when storing BLOB data, the RBLOB engine 110 may receive BLOB data from the client device 20 via the SQL processor 102. The RBLOB engine 110 may then store the received BLOB data in the cloud object storage 30 using the storage gateway connector 120 and the storage gateway 130. The storage gateway connector 120 may be an interface for the RBLOB store 104 to connect to the storage gateway 130. The storage gateway 130 may be configured to mediate between the database 100' and the cloud object storage 30. For example, the storage gateway 130 may provide a single interface to the database 100' for communicating with different cloud storage services comprised in the cloud object storage.

Further, the RBLOB engine 110 may obtain a datalink (e.g. a URI) to the RBLOB data stored in the cloud object storage 30 and store the datalink in the column store 150 or the persistency 160. For example, the datalink may be stored in a corresponding column (e.g., RBLOB type column) of a data table stored in the column store 150 and/or the persistency 160. Thus, the content of the RBLOB data may be stored in the cloud object storage 30 that is external to the in-memory database system 10' and only the datalink (e.g., a reference to the external storage) may be kept within the database 100'.

When deleting BLOB data, for example, the RBLOB engine 110 may delete the datalink in the data table stored in the database 100' (e.g., in the column store 150 or the persistency 160), without deleting the BLOB data stored in the cloud object storage 30. The RBLOB engine 110 may store, in the deletion history table, the datalink deleted from the data table with a timestamp corresponding to a point in time when the data link is deleted from the data table.

When updating the BLOB data stored in the cloud object storage 30, the RBLOB engine 110 may store the updated BLOB data in the cloud object storage 30, via the storage gateway connector 120 and the storage gateway 130, without deleting the older version of the BLOB data before the update. The RBLOB engine 110 may obtain an updated datalink (e.g., an updated URI) to the updated BLOB data from the cloud object storage 30 and store the updated datalink in the data table. The RBLOB engine 110 may delete the datalink to the older version of the BLOB data from the data table and store the deleted datalink in the deletion history table with a timestamp corresponding to the point in time when the datalink was deleted.

Further, the RBLOB engine 110 may store some BLOB data in the RBLOB cache 108. For example, least recently used (LRU) BLOB data and/or most frequently used (MFU) BLOB data may be stored in the RBLOB cache 108. The RBLOB cache 108 may have a configurable capacity. For example, the capacity of the RBLOB cache 108 may be specified by a user. The use of the RBLOB cache 108 may improve access latency, as the RBLOB engine 110 does not need to access the cloud object storage 30 for the BLOB data stored in the RBLOB cache 108.

As stated above, the RBLOB engine 110 does not delete BLOB data from the cloud object storage 30 in either case of deleting or updating data. Only the datalink to the BLOB data to be deleted or updated may be deleted from the data table within the database 100'. Accordingly, in order to prevent the number of different versions of BLOB data stored in the cloud object storage 30 from keeping increasing, the garbage collector 106 may be configured to determine which data in the cloud object storage 30 to delete (or archive) and when. For example, the garbage collector 106 may delete, via the storage gateway connector 120 and the storage gateway 130, BLOB data stored in the cloud object storage 30 based on a specified maximum retention time of backup data for the in-memory database system 10' and on the timestamp of the datalink to the BLOB data stored in the deletion history table. Specifically, the garbage collector 106 may check whether the BLOB data is old enough to be deleted because, once the remote BLOB data is deleted from the cloud object storage 30, a rollback to the point in time when the BLOB data existed is not possible anymore. For example, if the timestamp in the deletion history table stored for the datalink to the BLOB data indicates a point in time before the specified maximum retention time, the garbage collector 106 may delete the BLOB data from the cloud object storage 30. Further, for example, the BLOB data may be considered old enough to be deleted, if the BLOB data do not exist in the youngest (in other words, most recent) database snapshot and were created before the oldest snapshot. The age of the oldest snapshot may depend on the specified maximum retention time. In some examples, instead of relying on the snapshots, all BLOB data the link to which have been deleted before the maximum retention time may be bulk-deleted. The datalinks stored in the deletion history table may be used to delete the actual BLOB data content in the cloud object storage 30.

The RBLOB backup manager 140 may be configured to manage backups of the database 100', in particular, backups concerning the BLOB data stored in the cloud object storage 30. For example, the RBLOB backup manager 135 may create snapshots of the data table stored in the database 100', periodically and/or at specified points in time. The data table may contain datalinks to BLOB data stored in the cloud object storage 30. When restoring backup, the datalinks in the relevant snapshot may be used for accessing the BLOB data stored in the cloud object storage 30.

It should be noted that, although the above description of the in-memory database system 10' shown in FIG. 3 may focus on handling of BLOB data, the in-memory database system 10' may also store and manage data other than BLOB data, such as data with a smaller data size than the BLOB data (e.g., numerical values and/or text data). The data other than BLOB data to be stored in the cloud object storage 30 may be stored in the column store 150 and/or the persistency 160, in a manner analogous to that for the in-memory database system 10 shown in FIG. 1.

The database 100' may determine which data to store within the database (e.g., in the column store 150 and/or persistency 160) and which data to store in the cloud object storage 30 based on the type of data received from the client device 20 as data to be stored. In some exemplary embodiments, the database 100' may determine that the data is to be treated by the RBLOB store 104 and stored in the cloud object storage 30 in case the data has the RBLOB data type as mentioned above. Additionally or alternatively, the database 100' may determine that data with a data size larger than a specified threshold value (e.g., 1 kB, 10 kB, 50 kB or 100 kB, depending on the circumstances) is to be treated by the RBLOB store 104 and stored in the cloud object storage 30. The data other than that stored in the cloud object storage 30 may be stored within the database 100'.

Storing the BLOB data in the cloud object storage 30 as the in-memory database system 10' shown in FIG. 3 as described above may be particularly advantageous in case a relatively large percentage of the whole data to be stored in the database is BLOB data. As a specific (but non-limiting) example, in case of managing data of employees of one or more companies, a database may need to store and manage not only attribute information relating to each employee (e.g., employee ID, first name, last name, position in the company, current salary, salary raise, compensation level, . . . ), which may easily be stored and managed in a relational table, but also data of documents exchanged between the companies and the employees (e.g., PDF of scanned letters, proofs of academic degrees etc., medical certificates, etc.). In some circumstances, audio and/or video data of recording some events involving the companies and the employees might also be stored in the database. In such an example, the percentage of BLOB data including data of documents, audio data and/or video data concerning each employee in the whole data stored in the database may reach up to 90%. Further, although such BLOB data may need to be kept in the database, such BLOB data is often not accessed as frequently as the attribute information relating to each employee. Employing the in-memory database system 10' as shown in FIG. 3 to store BLOB data in the cloud object storage 30 for such application of employee data management may provide efficient usage of data storage, while keeping data integrity and data consistency.

Exemplary Operations

Figure 4:
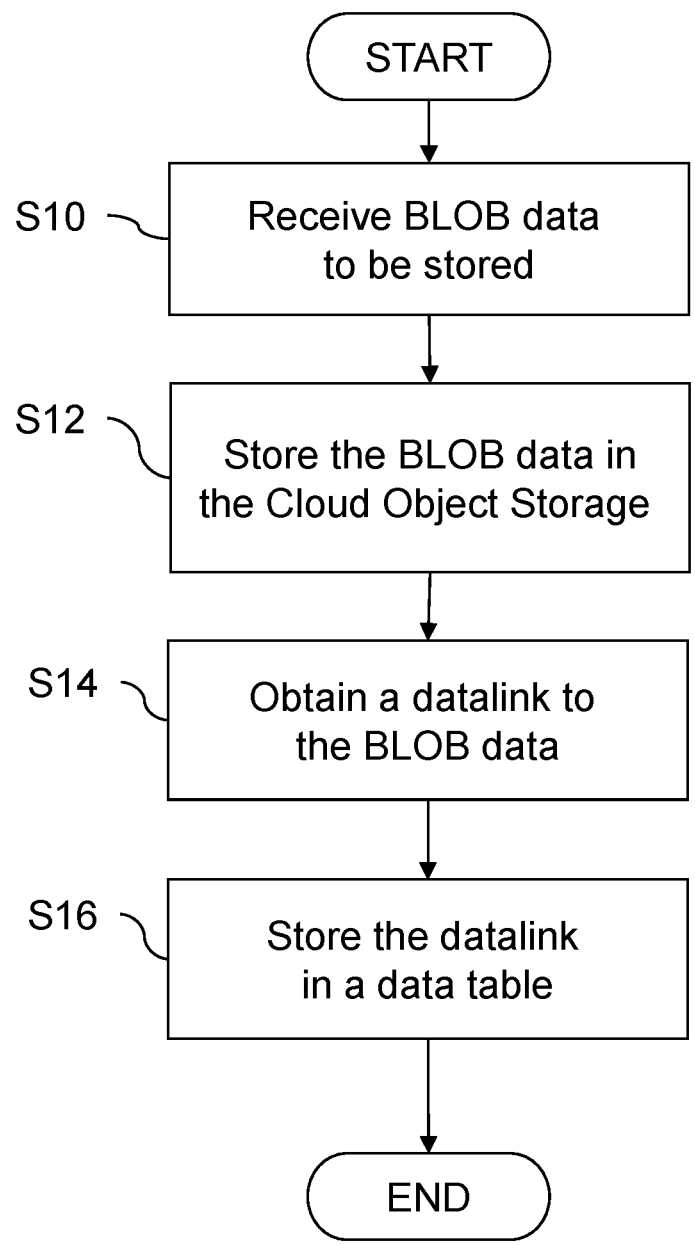
FIG. 4 shows a flow diagram of an exemplary process for storing data in the exemplary database system according to the present disclosure.

FIG. 4 shows a flow diagram of an exemplary process for storing data in the exemplary database system according to the present disclosure. The exemplary process shown in FIG. 4 may be started in response to a request received by the database 100' from the client device 20 to store BLOB data in the database 100', for example.

In step S10, the in-memory database system 10 may receive BLOB data (e.g., "first data" in the present disclosure) to be stored in the database 100. The BLOB data may be included in the request from the client device 20 to store the BLOB data. The BLOB data may be, for example, indicated as the remote BLOB (RBLOB) type. Subsequently, in step S12, the RBLOB engine 110 may store the received BLOB data in the cloud object storage 30 via the storage gateway connector 120 and the storage gateway 130. Further, in step S14, the RBLOB engine 110 may obtain a datalink to the BLOB data stored in the cloud object storage 30 via the storage gateway connector 120 and the storage gateway 130. Finally, in step S16, the RBLOB engine 110 may store the datalink in the data table that is stored in the column store 150 and/or the persistency 160. After step S16, the exemplary process shown in FIG. 4 may end.

Figure 5:
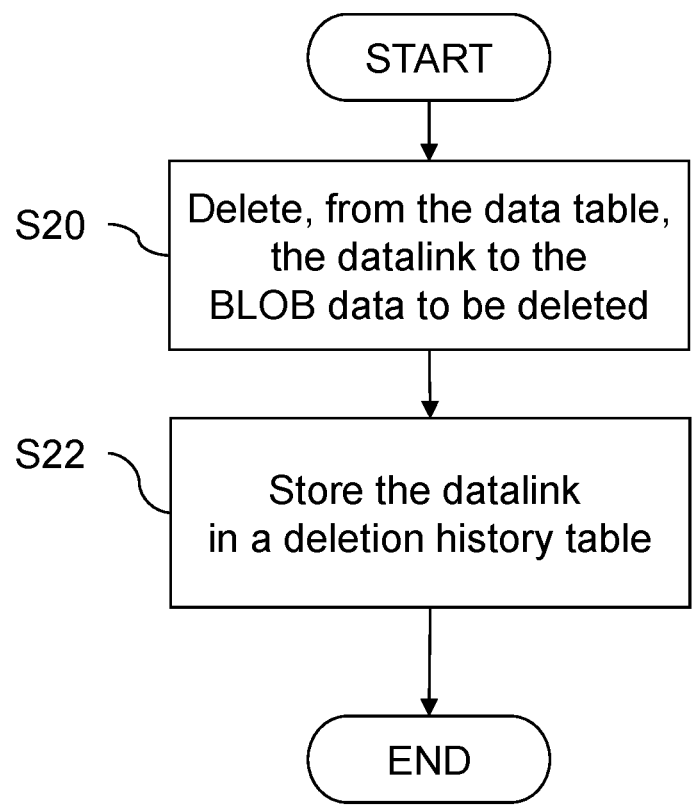
FIG. 5 shows a flow diagram of an exemplary process for deleting data in the exemplary database system according to the present disclosure.

FIG. 5 shows a flow diagram of an exemplary process for deleting data in the exemplary database system according to the present disclosure. The exemplary process shown in FIG. 5 may be started, for example, in response to a request from the client device 20 to delete specific BLOB data.

In step S20, the RBLOB engine 110 may delete, from the data table, the datalink to the BLOB data to be deleted, without deleting the BLOB data itself from the cloud object storage 30. Further, in step S22, the RBLOB engine 110 may store the deleted datalink in the deletion history table with a timestamp corresponding to a point in time when the datalink was deleted from the data table. After step S22, the exemplary process shown in FIG. 5 may end.

Figure 6:
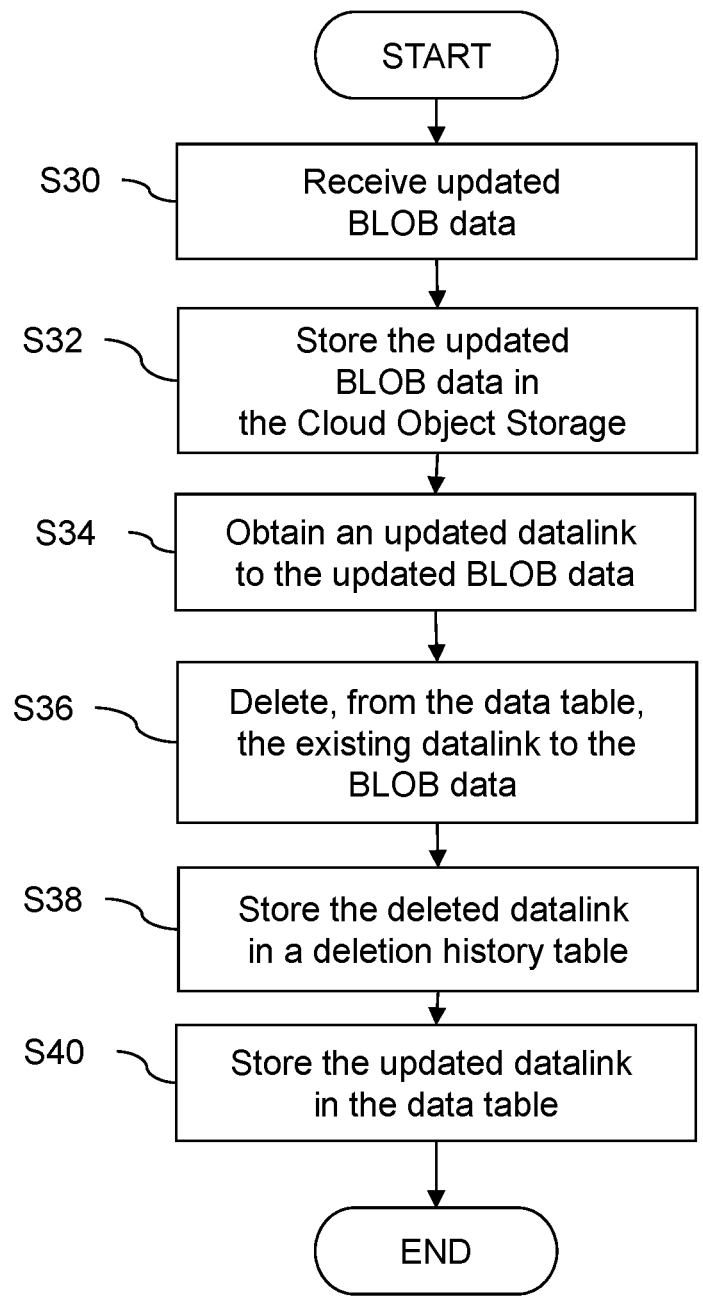
FIG. 6 shows a flow diagram of an exemplary process for updating data in the exemplary database system according to the present disclosure.

FIG. 6 shows a flow diagram of an exemplary process for updating data in the exemplary database system according to the present disclosure. The exemplary process shown in FIG. 6 may be started, for example, in response to a request from the client device 20 to update specific BLOB data.

In step S30, the RBLOB engine 110 may receive updated BLOB data. The updated BLOB data may be included in the request from the client device 20 to update the BLOB data. In step S32, the RBLOB engine 110 may store the updated BLOB data in the cloud object storage 30 via the storage gateway connector 120 and the storage gateway 130. Subsequently, in step S34, the RBLOB engine 110 may obtain an updated datalink to the updated BLOB data via the storage gateway connector 120 and the storage gateway 130. Further, in step S36, the RBLOB engine 110 may delete, from the data table, the existing datalink to the BLOB data before the update. The RBLOB engine 110 may then store the deleted datalink in the deletion history table in step S38. Further, in step S40, the RBLOB engine 110 may store the updated datalink in the data table. After step S40, the exemplary process shown in FIG. 6 may end.

Figure 7:
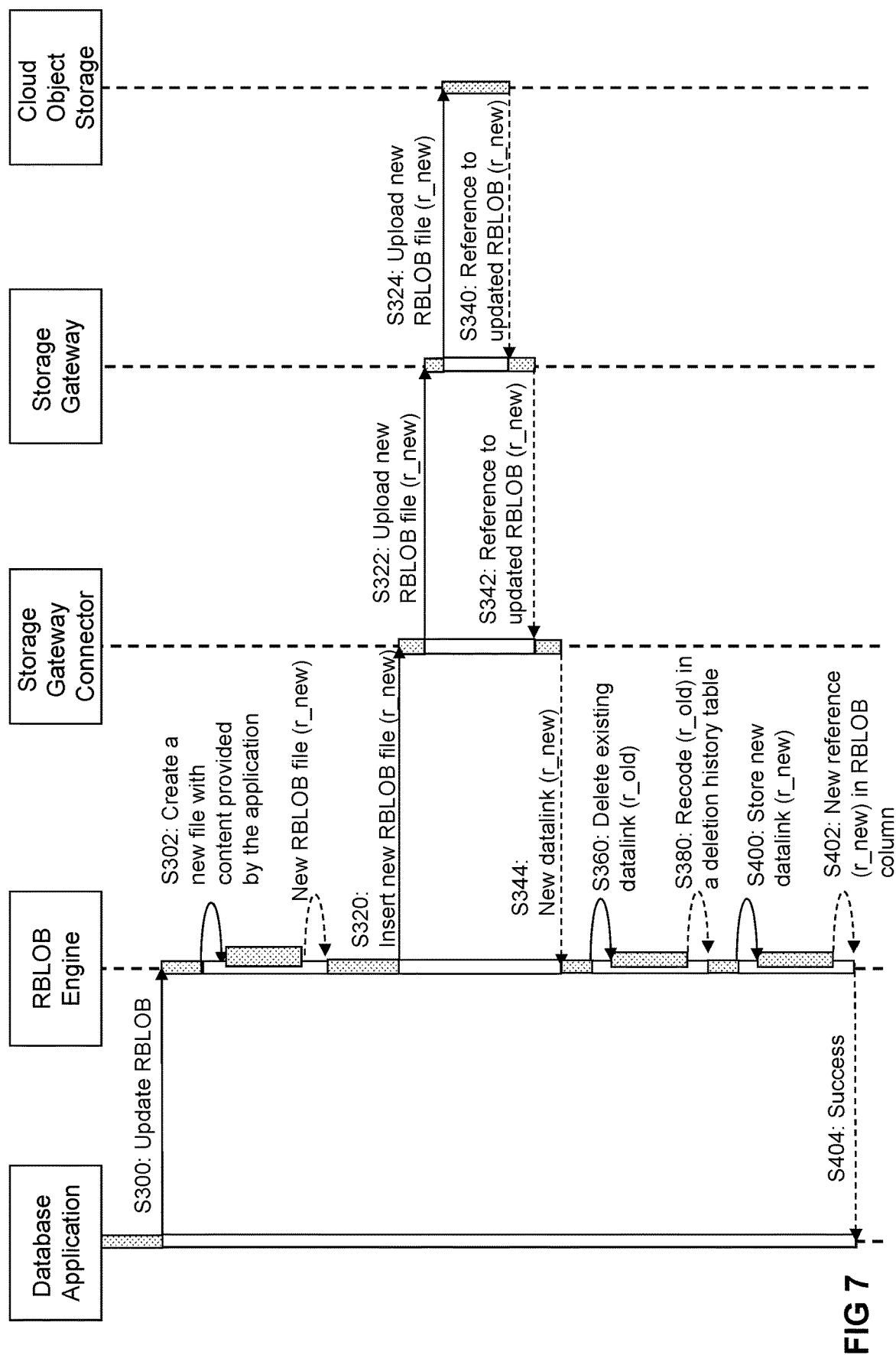
FIG. 7 shows a sequence diagram of an exemplary process for updating data in the exemplary database system according to the present disclosure.

FIG. 7 shows a sequence diagram of an exemplary process for updating data in the exemplary database system according to the present disclosure. The sequence diagram shown in FIG. 7 may be considered as an example of detailed sequence for performing the exemplary process shown in FIG. 6.

Referring to FIG. 7, the database application 200 of the client device 20 may send updated BLOB data (step S300) to the RBLOB engine 110. The RBLOB engine 110 may create a new file with content provided by the database application (step S302) and send an instruction to insert the new RBLOB file to the storage gateway connector 120 (step S320). The storage gateway connector 120 may then send an upload instruction including the new RBLOB file to the storage gateway 130 (step S322) and the storage gateway 130 may forward the upload instruction to the cloud object storage 30 (step S324). The new RBLOB file may then be uploaded to the cloud object storage 30 and the cloud object storage 30 may return, to the storage gateway 130, a reference (e.g., datalink) to the updated BLOB data (step S340). The storage gateway 130 may forward the received reference to the storage gateway connector 120 (step S342) and the storage gateway connector 120 may send the new datalink to the RBLOB engine 110 (step S344). The RBLOB engine 110 may delete the existing datalink from the data table (step S360) and record the deleted datalink in the deletion history table (step S380). Further, the RBLOB engine 110 may store the received new datalink in the data table (step S400), which may result in a new reference to be stored in the RBLOB column of the data table (step S402). Finally, the RBLOB engine 110 may send a message indicating successful update to the database application 200 (step S404).

Figure 8:
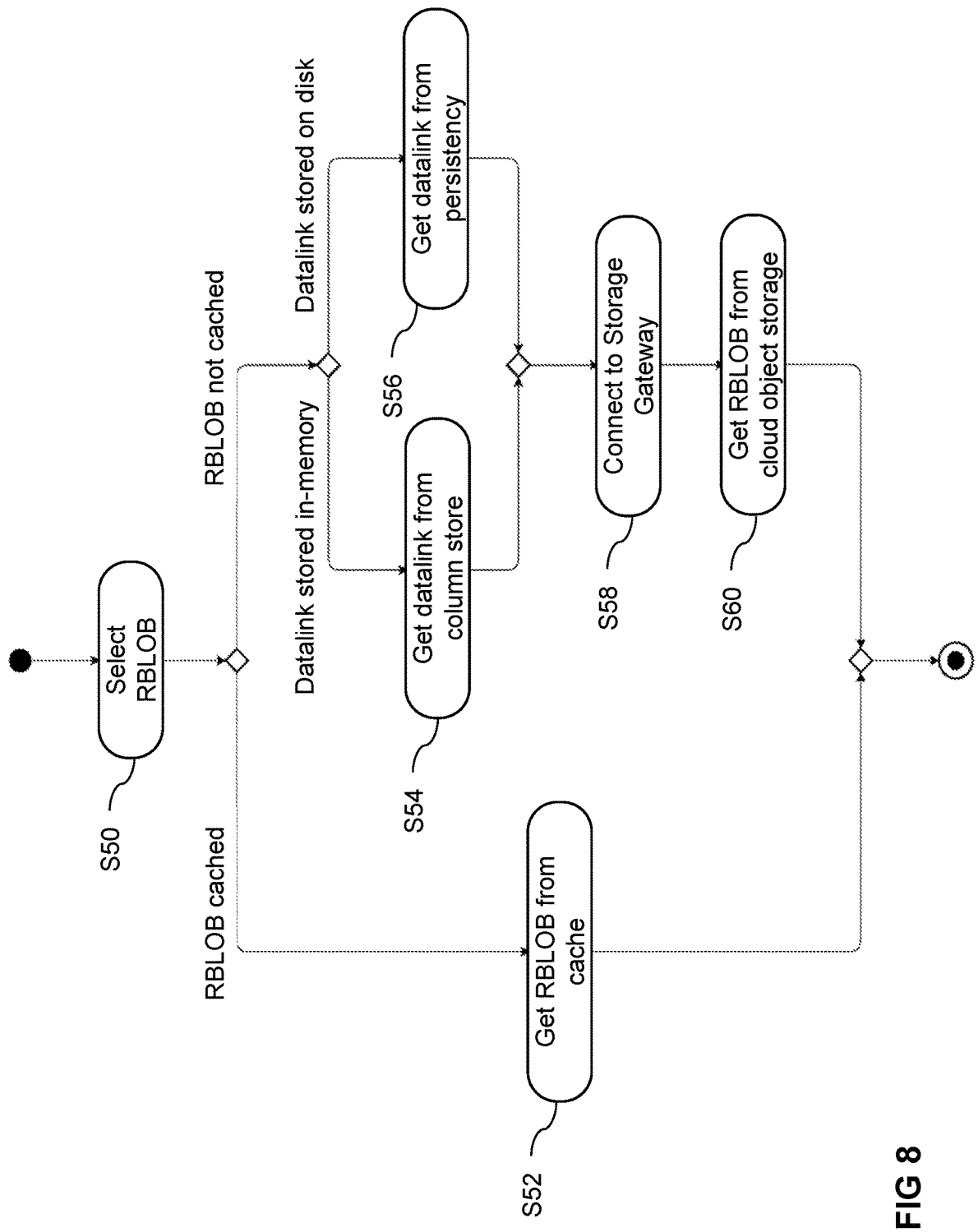
FIG. 8 shows a flow diagram of an exemplary process for selecting data in the exemplary database system according to the present disclosure.

FIG. 8 shows a flow diagram of an exemplary process for selecting data in the exemplary database system according to the present disclosure. The exemplary process shown in FIG. 8 may be started, for example, in response to a request from the client device 20 to select specific BLOB data.

In step S50, the RBLOB engine 110 may receive an instruction to select specific BLOB data. The instruction may include identification information of the BLOB data, for example, information identifying the row and column of the data table, in which the data item corresponding to the BLOB data is stored.

The RBLOB engine 110 may check if the specific BLOB data is cached in the RBLOB cache 108. If yes, the RBLOB engine 110 may obtain the BLOB data from the RBLOB cache 108 in step S52.

If not, the RBLOB engine 110 may check whether the datalink to the specific BLOB data is stored in-memory (e.g., in the column store 150) or on disk (e.g., in the persistency 160). In case the datalink is stored in-memory, the RBLOB engine 110 may obtain the datalink from the column store 150 in step S54. In case, on the other hand, the datalink is stored on disk, the RBLOB engine 110 may obtain the datalink from the persistency 160.

After obtaining the datalink either from the column store 150 or the persistency 160, the RBLOB engine 110 may connect to storage gateway 130 using the storage gateway connector 120. Subsequently, in step S60, the RBLOB engine 110 may obtain the BLOB data from the cloud object storage 30. The exemplary process shown in FIG. 8 may end after step S60.

Exemplary Implementation with SAP HANA Cloud

The in-memory database system 10' as described above with reference to FIGS. 3 to 8 may be implemented with SAP HANA Cloud. SAP HANA Cloud is a fully managed in-memory cloud database as a service (DBaaS) offered by SAP. The following provides description on the exemplary implementation of the in-memory database system 10' with SAP HANA Cloud.

The existing HANA system knows Disk LOB that is stored in a disk storage device (see e.g., the persistency 160 shown in FIG. 3) and Hybrid LOB that is stored in main memory (e.g., the column store 150 shown in FIG. 3) in case the data size is within a size threshold (e.g., 1 kB). As a result, the existing LOB interface can distinguish between the persistence layer and in-memory columns. This generality may be leveraged for extending the LOB component with the RBLOB store 104 of FIG. 3, which in this section may be referred to as "HANA BLOB Store (HBS)". HBS may enable HANA to store Remote BLOBs (RBLOBs), or rather to delegate the storage of LOB data to a remote object store (e.g., the cloud object storage 30 shown in FIG. 3).

The HBS may interact with File Service's Storage Gateway (e.g., the storage gateway 130 shown in FIG. 3; hereinafter, referred to as "Storage Gateway"). The following provides details on how HANA may use the current API of the Storage Gateway when manipulating RBLOB data via SQL commands. After defining the naming convention for RBLOB data, the envisioned use cases exemplify the interaction between HBS and the Storage Gateway.

Naming Convention for RBLOBs
RBLOB_NAME:
FILE CONTAINER+/$SCHEMA)ID/$TABLE_ID/$ATTRIBUTE_ID/$RBLOB_ID File container: The Storage Gateway may provide file containers as physical storage unit. These file containers may be used to group related database artifacts and as abstraction layer for authentication and/or authorization to object stores. In so doing, they may equip the Storage Gateway with a multi-tenant functionality. In other words, each tenant can use its own file container. In order to operate on a tenant's RBLOB data, HANA then may use the HDL (HANA Data Lake) Operator and provide a tenant's (user-) name in order to obtain a client certificate for authentication and authorization. Consequently, a mapping between a tenant and its file container may exist and no $TENANT_ID needs to be included in the above-stated naming convention. Moreover, RBLOB data may be prefixed with their tenant's name in any case. This is because file containers may be implemented by creating namespaces in the underlying object stores. After the creation of a file container, all related data uploaded to the file container may be prefixed with a tenant's name implicitly.

The most fine-grained artifact in HANA to create a file container for may be schemas. For every artifact smaller than a schema, e.g., tables and partitions, no namespace shall be created by means of file containers. After all, file containers may have their own lifecycle management which may be expensive.

Database structure: Object stores may be key value stores and as such are not necessarily hierarchical. A hierarchy may be helpful for querying sets of related objects, though. Therefore, artificial hierarchy levels may be introduced and all RBLOB data may follow above naming convention. This naming convention may reflect a database's structure of schemas, tables, and attributes (see $SCHEMA_ID, $TABLE_ID, $ATTRIBUTE_ID). Mapping this structure to the Storage Gateway may facilitate the identification of related objects. As can be seen, HANA's unique IDs may be used in the above-stated naming convention because IDs may prevent that RBLOB data need to be renamed in the object store when copied (e.g., $SCHEMA_ID). After all, in case of a file copy, a new object with a new ID may be created.

Garbage Collection of RBLOBs

TABLE 1

RBLOB_DELETION_HISTORY table
RBLOB_DELETION_HISTORY

| deleted_at | timestamp |
|---|---|
| schema_id | int |
| table_id | int |
| attribute_id | int |
| rblob_id | int |

New HANA Table: In case RBLOB data are deleted by HANA users, the actual LOB content in the remote object store cannot be deleted immediately. After all, HANA users can choose to do a point-in-time recovery and if the remote LOB content was deleted, the reference in HANA would be invalid after a rollback. This may mean that as soon as remote LOB data items are deleted, a rollback to the point in time when these data items existed is not possible anymore. However, remote LOB data cannot be kept forever and need to be garbage-collected at some point in time (e.g., due to cost reasons). To this end, their deletion date may be stored in HANA in the new table RBLOB_DELETION_HISTORY (see Table 1 above). Hence, this may table contain all data items which were deleted in HANA but persist in the object store.

The above approach may result in "orphaned" RBLOB data items that are neither referenced in HANA anymore nor stored in the RBLOB_DELETION_HISTORY-table but exist in the Storage Gateway. To this end, a periodic job could be run that scans all file containers for files which are neither part of the RBLOB_DELETION_HISTORY-table nor referenced in HANA. As such job may have a presumably long runtime, it may only be executed infrequently.

As shown above, the deletion date, deleted_at, may be stored as TIMESTAMP in HANA (i.e., YYY-MM-DD HH24:MI:SS.FF7) and indicate the point in time, a file has been deleted by a user. Consequently, a record in this table may be generated after the commit of a DELETE transaction in HANA (cf. UC6: DELETE RBLOB (locally)). In order to decide whether data which had been marked as deleted in the table RBLOB_DELETION_HISTORY are old enough to be actually deleted in the object store, deleted_at may be compared to the earliest point in time users can recover their data to. As soon as the timestamp stored in deleted_at is smaller (e.g., before) this point in time, remote LOB content can be deleted.

In order to reduce the large memory footprint that might come along with the introduction of the RBLOB_DELETION_HISTORY—table, HBS may leverage NSE (Native Storage Extension) and specify certain warm data in this table as page-loadable. As this table could still become a bottleneck, data may be further hash-partitioned on their deleted_at-timestamp. One could also consider shipping HBS with a pre-partitioned RBLOB_DELETION_HISTORY—table.

The earliest point in time users can recover their data to may need to be input by the customer. After all, HANA can only know this point in time for log backups but not for data backups. Therefore, customers may need to execute a TRUNCATE-statement containing said timestamp. In case customers do never delete their backups, the RBLOB_DELETION_HISTORY—table may grow extremely large and a data aging-concept may become necessary to reduce the cost for storing potentially "useless" data, or rather data the customer does not pay for. Should NSE not suffice, data from the RBLOB_DELETION_HISTORY-table could also be offloaded to cloud storages.

Garbage Collection: HANA may run an asynchronous task in order to identify RBLOB content that can be deleted in object stores, e.g. to compare deleted_at of all entries in RBLOB_DELETION_HISTORY with the earliest possible recovery point. Once identified, UC9: DELETE RBLOB (remotely) may be executed for each record.

Use Cases—Overview—

Figure 9:
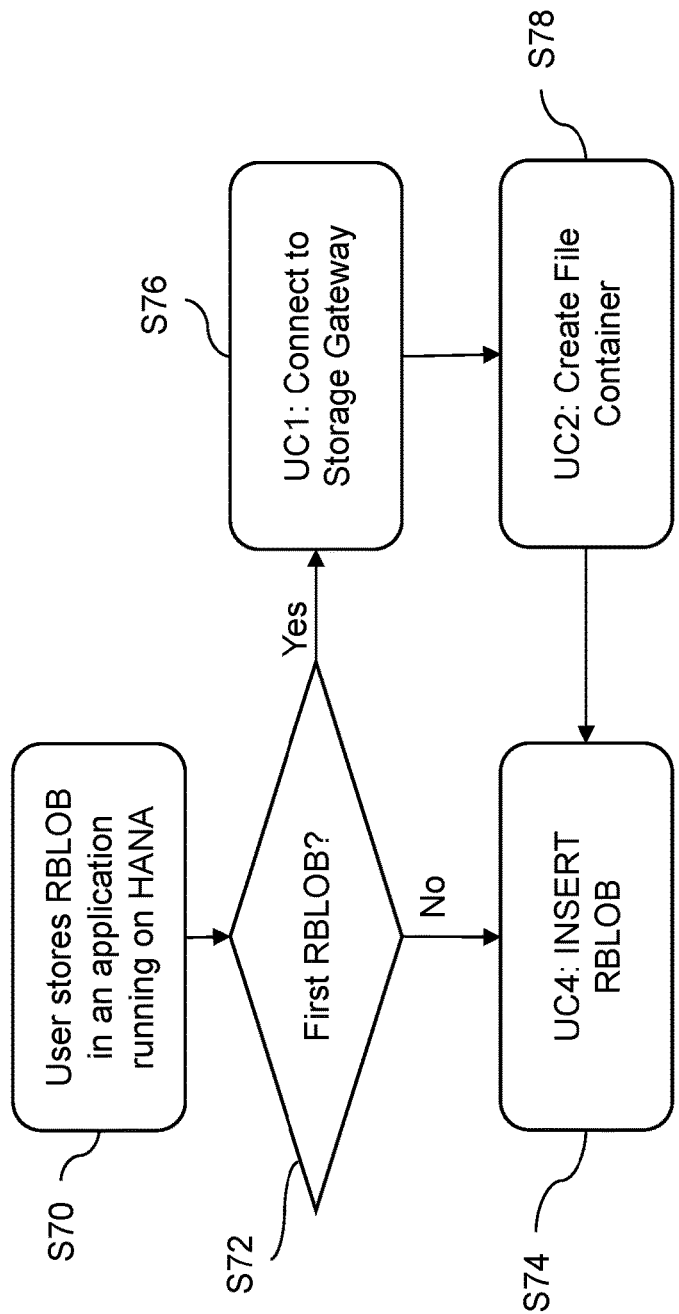
FIG. 9 shows a flow diagram of an exemplary process for storing data in an exemplary embodiment.

In case a customer stores her first RBLOB in the application that uses HANA (see e.g., UC4: INSERT RBLOB), HBS may need not only to connect to the Storage Gateway but also to create a file container. Thus, two scenarios may need to be differentiated, when inserting RBLOBs. In this regard, FIG. 9 shows a flow diagram of an exemplary process for storing data in the exemplary implementation. The exemplary process shown in FIG. 9 may be performed in response to a request from the client device 20 to store BLOB data in HANA. The exemplary process shown in FIG. 9 assumes that one connection per tenant is used.

Referring to FIG. 9, in step S70, the user may store RBLOB in the database application 200 running on HANA. In step S72, a determination may be made as to whether the RBLOB is the first RBLOB data to be stored for the user. If the RBLOB data is the first RBLOB data for the user (yes in step S72), the RBLOB engine 110 may connect to the storage gateway 130 in step S76. After step S76, a file container for the user is created in step S78.

In case the RBLOB data is not the first RBLOB data for the user (no in step S72) or after step S78, the RBLOB engine 110 may perform an operation to insert RBLOB in step S74.

Figure 10:
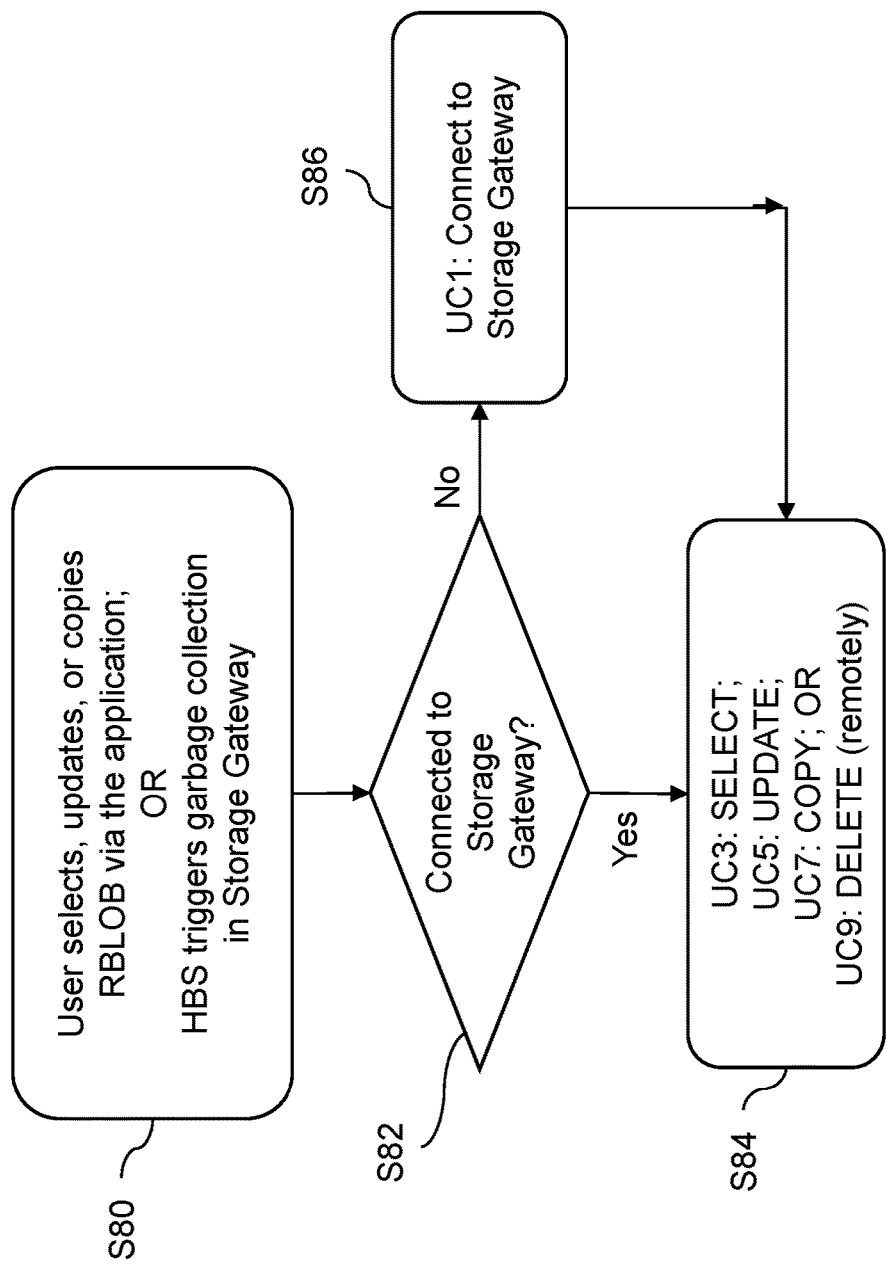
FIG. 10 shows a flow diagram of an exemplary process for data operations in the exemplary embodiment.

For operations, UC3: SELECT RBLOB, UCS: UPDATE RBLOB, UC7: COPY RBLOB, and UC9: DELETE RBLOB (remotely), HBS may need to establish a connection to the Storage Gateway beforehand. Note that the JWT (JSON Web Token) the Storage Gateway provides as part of the response to a connection request, may expire after 24 hours. Hence, HBS may need to check whether the connection is still valid and request a new one in case of expiration. FIG. 10 shows a flow diagram of an exemplary process for data operations in the exemplary implementation. The exemplary process may be performed, for example, in response to a request from the client device 20 to perform one or more of the operations as stated above.

Referring to FIG. 10, in step S80, the user may select, update or copy RBLOB via the application. Alternatively, in step S80, the HBS may trigger garbage collection in the Storage Gateway. In step S82, a determination may be made as to whether the RBLOB engine 110 is connected to the Storage Gateway. If the RBLOB engine 110 is connected to the Storage Gateway (yes in step S82), a corresponding operation of UC3: SELECT, UCS: UPDATE, UC7: COPY, or UC9: DELETE (remotely) may be performed in step S84. If the RBLOB engine 110 is note connected to the Storage Gateway (no in step S82), an operation of UC1: Connect to Storage Gateway may be performed at step S86. After step S86, the exemplary process may proceed to step S84.

<UC1: Connect to Storage Gateway>

| | |
|---|---|
| Level | • Subtask |
| Interest | • Users wants to establish a trusted connection to Storage Gateway |
| | • User wants to be authenticated and authorized |
| Preconditions | • HDLF_MODE is enabled within File Service |
| Postconditions | • Success scenario(s): |
| |     o Received JSON Web Token2 (JWT) to identify connection being used |
| | • Error scenario(s): |
| |     o Threw exception to application |

Success scenario(s) • UC1S1 Register connection:

o HBS → POST request /webhdfs/v1/?op=REGISTERCONNECTION3

```
{
    "type": "S3",
    "X-Datahub-User": "datahub-user",
    "X-Datahub-Tenant": "datahub-tenant",
    "X-Datahub-CABundle": "",
    "properties": {
```

```
            "rootPath": "/bucketName",
            "endpoint": "s3.amazonaws.com",
            "accessKey": "AWS_ACCESS_KEY_ID",
            "secretKey": "AWS_SECRET_ACCESS_KEY"
        }
    }
o SG → HTTP 200 return
{
    "type": "SDL",
    "contentData": {
        "host": "storagegateway",
        "port": 14000,
        "protocol": "swebhdfs",
        "publicHost": "publichost",
        "publicPort": 443,
        "authToken": "$JWT",
        "rootPath": "/",
        "targetUri": "sdl://8fda851e5b1d16449f8c3479ebf89d882d6f24cd0"
    }
}
``` o HBS → parse $JWT from response and store it together with its expiration time (24h)

Error scenario(s) • UC1S2 Invalid request:

o HBS → POST request as specified in UC1S1 o SG → no response o HBS → propagate error to application by throwing exception with error message

• UC1S3 Network error: retry request

<UC2: Create File Container>

Level      • Subtask

| | |
|---|---|
| Interest | • User wants to create a file container on the remote object store with the tenant name as prefix |
| Preconditions | • HDLF_MODE is enabled within File Service |
| Postconditions | • Success scenario(s):<br>    o Created namespace with tenant name<br>    o Implicitly prefixed all RBLOB data uploaded to this file container with tenant's name<br>• Error scenario(s):<br>    o Threw exception to application |
| Success scenario(s) | • UC2S1 Create file container:<br>    o HBS → PUT request /webhdfs/v1/?op=CREATE_FILECONTAINER<br>    o SG → HTTP 201<br>"The file container is created successfully on the remote object store." |
| Error scenario(s) | • UC2S2 Bad request:<br>    o HBS → request as specified in UC2S1<br>    o SG → HTTP 400<br>"Bad request, operation not supported due to HDLF_MODE being disabled."<br>• UC2S3 Unauthorized request:<br>    o HBS → request as specified in UC2S1<br>    o SG → HTTP 401<br>"Unauthorized request due to invalid client certificates."<br>• UC2S4 Internal error:<br>    o HBS → request as specified in UC2S1<br>    o SG → HTTP 500<br>"Unauthorized request due to invalid client certificates."<br>• UC2S5 Network error: retry request |

<UC3 SELECT RBLOB>

| | |
|---|---|
| Level | • User goal |

| | |
|---|---|
| SQL statement | • SELECT $RBLOB_COL FROM $TABLE WHERE $KEY_COL = 1; |
| Preconditions | • Same as for reading Disk/ Hybrid LOBs (created table, etc.) |
| | • Registered connection with Storage Gateway (see UC1) |
| |    o Expiration of JWT after 24h; if expired a new JWT needs to be requested (check necessary) |
| | • Created file container for respective tenant (see UC2) |
| Postconditions | • Success scenario(s) |
| |    o Downloaded RBLOB data and enabled read access for HANA client |
| | • Error scenario(s): |
| |    o Threw exception to application |
| Assumption(s) | • JWT is sent in Authorization header of all requests to Storage Gateway as follows: Authorization: Bearer $JWT |
| Success scenario(s) | • UC3S1 Read content of a file: |
| |    o HBS → |
| |        • compose $RBLOB_NAME4 and validate it |
| |        • GET request /webhdfs/v1/$RBLOB_NAME?op=OPEN |
| |           • size of buffer can be specified using &buffersize=&int32 |
| |    o SG → HTTP 200 |
| |    { |
| |      File content |
| |    } |
| |    o HBS → enable read access for HANA client |
| | • Extended success scenario(s): |
| |    o UC3S2 Redirection of request in UC3S1: |
| |        • HBS → GET request as specified in UC3S1 |
| |        • SG → |
| |           • IF noredirect=true HTTP 307 (temporary redirect) |
| |           • ELSE HTTP 200 |
| |           { |
| |             "redirection_url": "string" |

|                  |                                                                                      |
|------------------|--------------------------------------------------------------------------------------|
|                  | }                                                                                    |
|                  | ▪ HBS → follow redirection_url                                                       |
| Error scenario(s)| • UC3S3 File not found:                                                              |
|                  |    o HBS → GET request as specified in UC3S1                          |
|                  |    o SG → HTTP 404                                                    |
|                  |    {                                                                  |
|                  |      "exception": "string",                                 |
|                  |      "javaClassName": "string",                             |
|                  |      "message": "string"                                    |
|                  |    }                                                                  |
|                  |    o HBS → propagate error to application by throwing FileNotFoundException |
|                  | • UC3S4 Invalid request:                                                             |
|                  |    o HBS → request as specified in UC3S1                              |
|                  |    o SG → HTTP 400                                                    |
|                  |    {                                                                  |
|                  |      "exception": "string",                                 |
|                  |      "javaClassName": "string",                             |
|                  |      "message": "string"                                    |
|                  |    }                                                                  |
|                  |    o HBS → propagate error to application by throwing exception with error message |
|                  | • UC3S5 Network error: retry request as specified in UC3S1                           |
|                  |    o Starting position to read bytes can be specified using &offset=$int64 (default: starts at beginning) |

<UC4 INSERT RBLOB>

| | |
|---|---|
| Level | • User goal |
| SQL statement | • INSERT INTO $TABLE ($KEY_COL, $RBLOB_COL) VALUES (1, ?); |
| Preconditions | • Same as for inserting Disk/ Hybrid LOBs (created table, etc.) |
| | • Registered connection with Storage Gateway (see UC1) |

|  |  |
|---|---|
|  | o Expiration of JWT after 24h; if expired a new JWT needs to be requested (check necessary)<br>• Created file container for respective tenant (see UC2) |
| Postconditions | • Success scenario(s), i.e., uploaded RBLOB to Storage Gateway and inserted RBLOB reference into HANA:<br>    o Reference to remote object in $URI_COL<br>• Error scenario(s):<br>    o NO reference to remote object in $URI_COL<br>    o Threw exception to application Assumption(s)<br>        • JWT is sent in Authorization header of all requests to Storage Gateway as follows: Authorization: Bearer $JWT<br>        • To keep first implementation simple, query parameters for specifying a file's block size (&blocksize=$int64), its number of replications (&replication=$int32), and permissions (&permission=$string) do not need to be used. |
| Success scenario(s) | • UC4S1 Insert new file (success scenario):<br>    o HBS →<br>        ▪ compose $RBLOB_NAME and validate it<br>        ▪ PUT request /webhdfs/v1/$RBLOB_NAME?op=CREATE<br>            • Size of buffer can be specified using &buffersize=&int32<br>    o SG → HTTP 201 return reference to RBLOB<br>    {<br>      "location": "reference2RBLOB"<br>    }<br>    o HBS → INSERT RBLOB into HANA (store reference2RBLOB in $URI_COL)<br>• Extended success scenario(s):<br>    o UC4S2 Overwrite existing file:<br>        ▪ HBS →<br>            • compose $RBLOB_NAME and validate it |

- PUT request /webhdfs/v1/$RBLOB_NAME?op=CREATE&overwrite=TRUE
  - o Size of buffer can be specified using &buffersize=&int32
- SG → HTTP 201 return reference to RBLOB

{

"location": "reference2RBLOB"

}

- HBS → INSERT RBLOB into HANA (store reference2RBLOB in $URI_COL)

o UC4S3 Redirection of requests in UC4S1 and UC4S2:
- HBS → PUT requests as specified in UC4S1 and UC4S2
- SG →
  - IF noredirect=true HTTP 307 (temporary redirect)
  - ELSE HTTP 200

{

"redirection_url": "string"

}

- HBS → follow redirection_url
- SG → HTTP 201 return reference to RBLOB

{

"location": "reference2RBLOB"

}

- HBS → INSERT RBLOB into HANA (store reference2RBLOB in $URI_COL)

Error scenario(s) • UC4S4 File already exists and overwrite=FALSE:

o HBS → PUT requests as specified in UC4S1 and UC4S2 o SG → HTTP 400 o HBS →
- do not INSERT RBLOB into HANA

- propagate error to application by throwing exception with error message
- UC4S5 Connection timeout:
    - HBS →
        - PUT requests as specified in UC4S1 and UC4S2
        - EITHER
            - detect TO and implement retry-logic
        - OR
            - do not INSERT RBLOB into HANA
            - propagate error to application by throwing TOException
- UC4S6 File exceeds max size:
    - HBS →
        - PUT requests as specified in UC4S1 and UC4S2
        - intercept on application layer before upload
        - Note: In the future, HBS can be extended to support chunked uploads.
- UC4S7 File only uploaded partially:
    - HBS →
        - PUT requests as specified in UC4S1 and UC4S2
        - retry upload by overwriting existing file as specified in UC4S2
        - do not INSERT RBLOB into HANA until upload is successful
- UC4S8 File upload not successful:
    - HBS → PUT requests as specified in UC4S1 and UC4S2
    - SG → HTTP 400 (invalid request)
    - HBS →
        - do not INSERT RBLOB into HANA
        - propagate error to application by throwing exception with error message
- UC4S9 Transaction abort/ failure after successful insertion into Storage Gateway:

- o HBS →
  - compose $RBLOB_NAME from Storage Gateway response
  - DELETE request /webhdfs/v1/$RBLOB_NAME?op=DELETE (in case DELETE request fails, retry necessary ←
    - fallback if multiple retries fail: create entry in RBLOB_DELETION_HISTORY -table)
- o SG → HTTP 200 { "boolean": true }
- o HBS → propagate insertion failure to application by throwing exception with error message

<UC5 UPDATE RBLOB>

Level • User goal

SQL statement • UPDATE $TABLE SET $RBLOB_COL = EMPTY_BLOB() WHERE $KEY_COL = 1;

Preconditions • Same as for updating Disk/ Hybrid LOBs (record for key specified in WHERE-clause exists, etc.)

• Registered connection with Storage Gateway (see UC1) o Expiration of JWT after 24h; if expired a new JWT needs to be requested (check necessary)

• Created file container for respective tenant (see UC2)

Postconditions • Success scenario(s):

o Created new object in remote object store for modified content o Same postconditions as for success scenario(s) in UC6: DELETE RBLOB (locally)

o Replaced $OLD_REFERENCE in $URI_COL with reference to new remote object

• Error scenario(s):

o Threw exception to application

Assumption(s) • JWT is sent in Authorization header of all requests to Storage

Gateway as follows: Authorization: Bearer $JWT

Success scenario(s) • UC5S1 Update existing RBLOB o a Insert new file as specified in UC4S1 (UC4 INSERT RBLOB) and buffer reference to new remote object ($NEW_REFERENCE)

o b Delete existing RBLOB locally in HANA as specified in UC6S1 (UC6 DELETE RBLOB (locally))

o c HBS → update $OLD_REFERENCE with $NEW_REFERENCE in HANA RBLOB $URI_COL

• Extended success scenarios:

o For UC5S1a

▪ Overwrite existing file

• see steps in UC4S2 (UC4 INSERT RBLOB)

▪ Redirection of PUT request

• see steps in UC4S3 (UC4 INSERT RBLOB)

Error scenario(s) • For UC5S1a see UC4S4- UC4S9 (UC4 INSERT RBLOB)

• For UC5S1b error handling is identical to deletion failure of Disk/ Hybrid LOBs, additionally no record in RBLOB_DELETION_HISTORY-table is generated

<UC6 DELETE RBLOB (locally)>

Level • User goal

SQL statement • DELETE FROM $TABLE WHERE $KEY_COL = 1;

Preconditions • Same as for deleting Disk/ Hybrid LOBs (record for key specified in WHERE-clause exists, etc.)

• No connection to Storage Gateway necessary

Postconditions • Success scenario(s):

o Removed HANA reference of RBLOB from $RBLOB_TABLE o Generated record in RBLOB_DELETION_HISTORY -table for removed RBLOB o Corresponding RBLOB content in object store still exists

• Error scenario(s):

o NO record in RBLOB_DELETION_HISTORY -table for removed RBLOB o Threw exception to application Success scenario(s) • UC6S1 Delete single RBLOB locally o HBS →

- buffer schema_id, table_id, attribute_id, rblob_id of respective RBLOB
- delete RBLOB reference from $TABLE but do not propagate any change to Storage Gateway
- generate record in RBLOB_DELETION_HISTORY-table: set all attributes, i.e., deleted_at, schema_id, table_id, attribute_id, rblob_id Error scenario(s) • Behavior identical to DELETE statement for Disk/ Hybrid LOBs

- In case of deletion failure, no record in RBLOB_DELETION_HISTORY-table is generated

<UC7 COPY RBLOB>

As no reference counting mechanism is currently available and the Storage Gateway does not offer an operation for copying files on the server-side, the copy of an RBLOB may be an actual download and upload.

Level • User goal

SQL statement • INSERT INTO $RBLOB_TABLE_TARGET ($KEY_COL, $RBLOB_COL) SELECT ($KEY_COL, $RBLOB_COL) FROM $RBLOB_TABLE_SOURCE WHERE $KEY_COL = 1;

Preconditions • Same as for UC3 SELECT RBLOB)/ UC4 (UC4 INSERT RBLOB)

Postconditions • Success scenario(s)

o Downloaded RBLOB data from source "table"5 in Storage Gateway o Uploaded RBLOB data to target "table" in Storage Gateway o Inserted RBLOB references in target table in HANA ($URI_COL)

• Error scenario(s):

o Threw exception to application

Assumption(s) • JWT is sent in Authorization header of all requests to Storage Gateway as follows: Authorization: Bearer $JWT Success scenario(s) • UC7S1 Copy existing RBLOB from one to another table o a Read existing RBLOB as specified in UC3S1 (UC3 SELECT RBLOB) but w/o enabling read access for HANA client o b Insert RBLOB read in a to new table as specified in UC4S1 (UC4 INSERT RBLOB) taking into account target table name when composing $RBLOB_NAME

- Extended success scenarios:

o For UC7S1a

- Redirection of GET request

• see steps in UC3S2 (UC3 SELECT RBLOB)

o For UC7S1b

- Overwrite existing file

• see steps in UC4S2 (UC4 INSERT RBLOB)

- Redirection of PUT request

• see steps in UC4S3 (UC4 INSERT RBLOB)

Error scenario(s) • For UC7S1a see UC3S3-5

• For UC7S1b see UC4S4- UC4S8

<UC8 RENAME RBLOB>

As mentioned in Naming Convention for RBLOBs, an RBLOB's name may be composed as follows in the remote object store: /$SCHEMA_ID/$TABLE_ID/$ATTRIBUTE_ID/$RBLOB_ID. This may imply that in case of a rename-operation, an RBLOB does not need to be renamed in the object store. After all, the latter may only know its ID which is not changed by a rename-operation. Hence, renaming an RBLOB may work the same as renaming Disk/ Hybrid LOBs and does not require any interaction with the Storage Gateway.

<UC9 DELETE RBLOB (remotely)>

| | |
|---|---|
| Level | • Subtask |
| Interest | • As described in Garbage Collection of RBLOBs, HANA may want to delete RBLOB content in object store after running async job inspecting RBLOB_DELETION_HISTORY -table<br>• For each RBLOB in RBLOB_DELETION_HISTORY -table whose deleted_at is smaller than earliest possible recovery point content may be deleted remotely |
| Preconditions | • Record in RBLOB_DELETION_HISTORY -table exists (see UC6 DELETE RBLOB (locally))<br>• Ran asynchronous HANA job to identify RBLOBs in RBLOB_DELETION_HISTORY -table which are old enough to be deleted<br>• Registered connection with Storage Gateway (see UC1)<br>   o Expiration of JWT after 24h; if expired a new JWT needs to be requested (check necessary)<br>• Created file container for respective tenant (see UC2) |
| Postconditions | • Success scenario(s) #<br>   o Deleted RBLOB content in object store o Deleted corresponding record in RBLOB_DELETION_HISTORY - table<br>• Error scenario(s):<br>   o Threw exception to application |
| Success scenario(s) | • UC9S1 Delete single RBLOB remotely<br>   o HBS →<br>      ▪ compose $RBLOB_NAME from record in RBLOB_DELETION_HISTORY -table<br>      ▪ DELETE request /webhdfs/v1/$RBLOB_NAME?op=DELETE<br>   o SG → HTTP 200 { "boolean": true }<br>   o HBS → delete corresponding record in RBLOB_DELETION_HISTORY -table |
| Error scenario(s) | • UC9S2 Connection timeout:<br>   o HBS → |

- DELETE request as specified in UC9S1
- EITHER
    - detect TO and retry
- OR
    - do not delete corresponding record in RBLOB_DELETION_HISTORY -table
    - propagate error to application by throwing TOException
- UC9S3 Invalid request:
    - HBS → DELETE request as specified in UC9S1
    - SG → no response
    - HBS → propagate error to application by throwing exception with error message

- Extension of Use Cases to Bulk Operations

This section describes how bulk operations of the above-stated use cases may be implemented. As mentioned in the Naming Convention for RBLOBs, unlike file systems, object stores may have no physical folders. Therefore, an artificial hierarchy may be introduced to identify sets of objects in an object store. By means of this hierarchy, which may be reflected in an RBLOBs name, related RBLOBs can be identified when iterating over all objects (e.g., the set of RBLOBs sharing the same schema and table ID belongs to the same table).

<UC10 SELECT multiple RBLOBs>

In order to read multiple RBLOBs, HANA may first query the references to these data items and then requests their content. To this end, UC3 SELECT RBLOB may be executed for each element in the result set. Instead of sending one GET request for each element in the result set, one GET request containing a list of $RBLOB_NAME may be sent. Note that pre- and postconditions may be the same as for UC3 SELECT RBLOB. To read related RBLOBs such as RBLOBs belonging to the schema, an alternative may be to extend Storage Gateway's API to accept GET requests like /webhdfs/v1/$SCHEMA_NAME?op=OPEN_SCHEMA, to iterate over all RBLOBs, and to examine their names. As the only difference to iterating in HANA may be less data being sent over the network, the effort for providing such additional endpoint may outweigh its benefits.

<UC11 INSERT multiple RBLOBs>

Inserting multiple RBLOBs may correspond to multiple executions of UC4 INSERT RBLOB.

<UC12 UPDATE multiple RBLOBs>

Updating multiple RBLOBs may correspond to multiple executions of UC5 UPDATE RBLOB.

<UC13 DELETE multiple RBLOBs (locally)>

The deletion of multiple related RBLOBs may be similar to UC6 DELETE RBLOB (locally). The only difference may be that not all of the attributes of the table RBLOB_DELETION_HISTORY are filled. In case HANA users delete an entire schema, deleted_at and schema_id may be filled and the remaining attributes (table_id, attribute_id, rblob_id) may be set to NULL. Deletion of tables and columns may work in the same manner, i.e., non-applicable attributes may be set to NULL. Note that pre- and postconditions may be the same as for UC6 DELETE RBLOB (locally).

<UC14 DELETE multiple RBLOBs (remotely)>

As mentioned in UC13 DELETE multiple RBLOBs (locally), non-applicable attributes may be set to NULL in case schemas, tables, or columns are deleted. Hence, when schemas/ tables/ columns removed from HANA have been identified as old enough to be deleted in the object store, a DELETE request similar to /webhdfs/v1/$RBLOB_NAME?op=DELETE may need to be sent to the Storage Gateway. Instead of $RBLOB_NAME containing /$SCHEMA_ID/$TABLE_ID/$ATTRIBUTE_ID/$RBLOB_ID, this request may only contain $SCHEMA_ID, $SCHEMA_ID/$TABLE_ID, or $SCHEMA_ID/$TABLE_ID/$ATTRIBUTE_ID. An according endpoint may need to be provided by the Storage Gateway. The Storage Gateway can then identify and delete RBLOBs belonging to the respective schema/ table/ column by iteration and name inspection. Note that pre- and postconditions may be the same as for UC9 DELETE RBLOB (remotely).

<UC15 COPY multiple RBLOBs>

Copying multiple RBLOBs may correspond to multiple executions of UC7 COPY RBLOB.

<UC16 RENAME multiple RBLOBs>

As it is the case for UC8 RENAME RBLOB, multiple RBLOBs can be renamed without changing their identifiers in the object store.

<UC17 BACKUP & RECOVER>

HANA's current backup & recovery process does not need to be changed but rather extended by providing customers with the possibility to include RBLOB data from the Storage Gateway. Hence, two options for backup & recovery may be provided:

1. In case a customer wants to include the RBLOB data in her backup, all RBLOBs may be downloaded as described in UC10 SELECT multiple RBLOBs and included in the HANA backup. If she restores her data, HANA may need to check whether the RBLOBs still reside in the object store. If this is the case, no data need to be uploaded. If RBLOBs do not reside in the object store anymore, they may need to be extracted from the HANA backup and uploaded as described in UC11 INSERT multiple RBLOBs.
2. In case the customer does not want to include the RBLOB data, the backup may only include the references to these data and the HANA backup is not extended.

Technical Advantages

The following provides possible technical advantages achieved by any one of the various aspects and embodiments described herein.

As stated above, according to some exemplary embodiments, data stored in RBLOB columns may be automatically moved to the associated file storage of the in-memory database system 10' (e.g., HANA cloud instance) without any control or interaction by the database application 200. For example, internally in HANA, the RBLOB columns may store references (e.g., URIs) to remote storage locations, but this implementation detail may be hidden from the database application. For query and DML statements (e.g., Insert, Update, Delete), the database application 200 may keep the same interaction pattern as they would have with the database when directly storing data in the existing format (e.g., hybrid LOB format). Particularly, from a functional point of view, the fact that data is not residing in the in-memory database system 10' itself may be invisible for applications and users. The only difference may be the changed performance characteristics, e.g. the additional interaction with the cloud storage platform might entail additional latency. When interacting with RBLOB columns, for example, the transactional semantics (ACID) may be guaranteed by the in-memory database system 10': e.g., when inserting new RBLOB data, the in-memory database system 10' may first propagates the data to the cloud storage provider, and only afterwards store a reference to the remote location in the relational table. For DELETE and UPDATE request, multi-version concurrency control (MVCC) may be used to ensure the same transactional semantics like e.g., for regular HANA LOBs.

Thus, according to some exemplary embodiments, as much of the solution complexity may be hidden from the end-users as possible. Further, handling the solution complexity within the in-memory database system 10' may enable the use of the existing database application, thereby facilitating deployment of the database system with the extended functionality according to some exemplary embodiments. By disallowing database applications to directly communicate with the cloud storage, the in-memory database system 10' may have more fine-grained control on data access, data caching and also enable garbage collection for the cleanup of data that is no longer referenced.

In some circumstances, multiple versions of the remote data may not only need to be consolidated in the context of MVCC but also as part of the point-in-time recovery in the in-memory database system 10'. In order to ensure consistency between the remote data stored in cloud storages and the corresponding URIs stored in in-memory database system 10' despite a rollback operation, each change to the RBLOB may create a new version of the remote data instead of overwriting it. This may mean in effect that remote data are immutable. To point to the new version of the remote data, the references within the RBLOB columns may change whenever data are changed by the database user. A rollback may then restore the URI to the version of the remote data at the specific point in time, which may ensure data integrity.

Hardware Configuration

Figure 11:
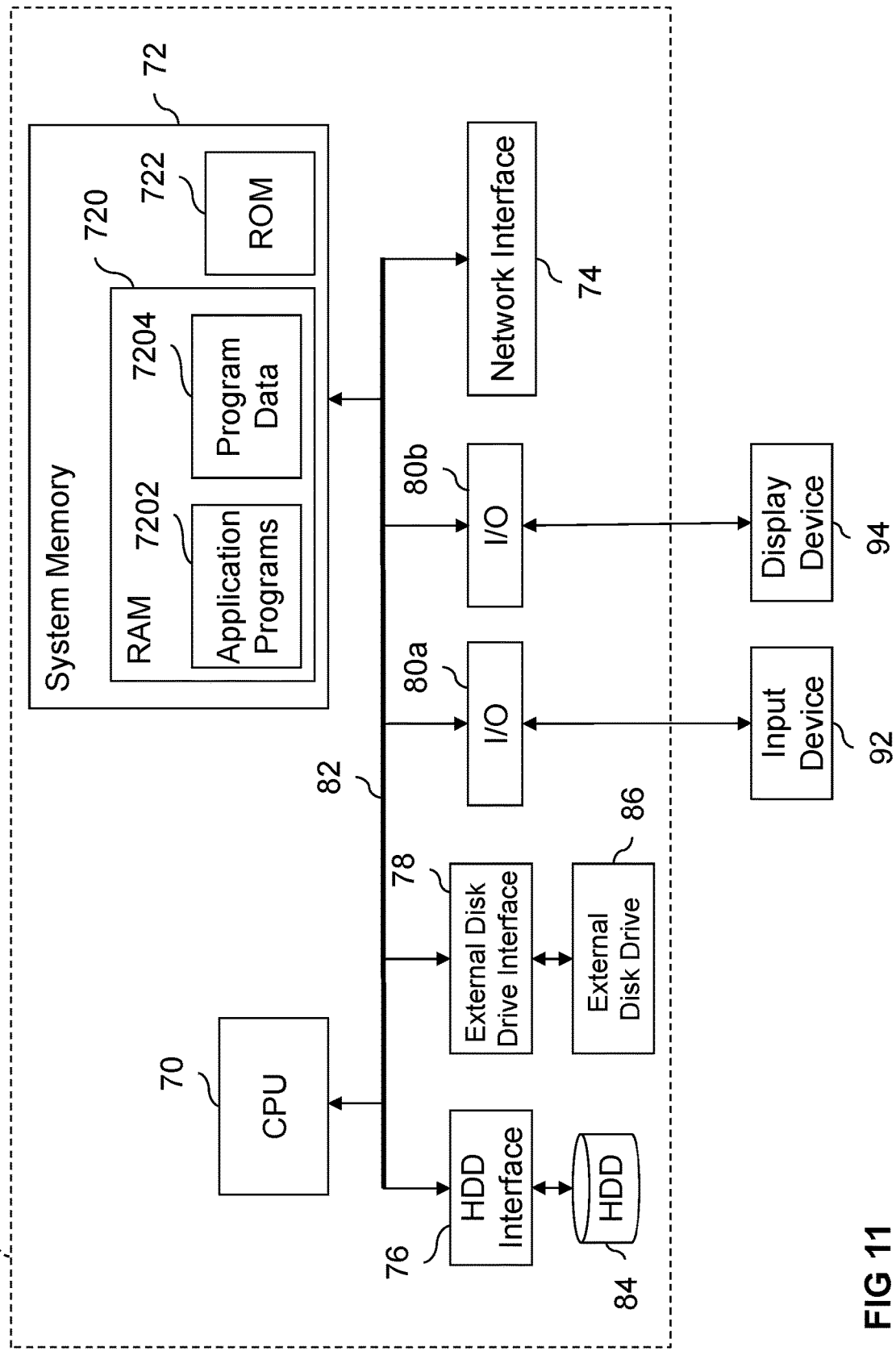
FIG. 11 shows an exemplary hardware configuration of a computer that may be used to implement exemplary embodiments and variations as described herein.

FIG. 11 shows an exemplary hardware configuration of a computer that may be used to implement exemplary embodiments and variations as described herein.

The computer 7 shown in FIG. 11 includes a CPU 70, a system memory 72, a network interface 74, a hard disk drive (HDD) interface 76, an external disk drive interface 78 and input/output (I/O) interfaces 80. These components of the computer are coupled to each other via a system bus 82. The CPU 70 may perform arithmetic, logic and/or control operations by accessing the system memory 72. The CPU 70 may implement the processors of the exemplary devices and/or system described above. The system memory 72 may store information and/or instructions for use in combination with the CPU 70. The system memory 72 may include volatile and non-volatile memory, such as a random access memory (RAM) 720 and a read only memory (ROM) 722. A basic input/output system (BIOS) containing the basic routines that helps to transfer information between elements within the computer 7, such as during start-up, may be stored in the ROM 722. The system bus 82 may be any of several types of bus structures including a memory bus or memory controller, a peripheral bus, and a local bus using any of a variety of bus architectures.

The computer may include a network interface 74 for communicating with other computers and/or devices via a network.

Further, the computer may include a hard disk drive (HDD) 84 for reading from and writing to a hard disk (not shown), and an external disk drive 86 for reading from or writing to a removable disk (not shown). The removable disk may be a magnetic disk for a magnetic disk drive or an optical disk such as a CD ROM for an optical disk drive. The HDD 84 and the external disk drive 86 are connected to the system bus 82 by a HDD interface 76 and an external disk drive interface 78, respectively. The drives and their associated computer-readable media provide non-volatile storage of computer-readable instructions, data structures, program modules and other data for the general purpose computer. The relevant data may be organized in a database, for example a relational database, an object database or a NoSQL database.

Although the exemplary environment described herein employs a hard disk (not shown) and an external disk (not shown), it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk, ROM 722 or RAM 720, including an operating system (not shown), one or more application programs 7202, other program modules (not shown), and program data 7204. The application programs may include at least a part of the functionality as described above.

The computer 7 may be connected to an input device 92 such as mouse and/or keyboard and a display device 94 such as liquid crystal display, via corresponding I/O interfaces 80a and 80b as well as the system bus 82. In case the computer 7 is implemented as a tablet computer, for example, a touch panel that displays information and that receives input may be connected to the computer 7 via a corresponding I/O interface and the system bus 82. Further, in some examples, although not shown in FIG. 11, the computer 7 may further be connected to a printer and/or an imaging device such as a camera, via corresponding I/O interfaces and the system bus 82.

The invention claimed is:

1. A computer-implemented method for database management, the method comprising:

receiving, from a client device, first data to be stored in a database system that comprises first data storage configured to store a data table and a deletion history table;
storing the first data in second data storage that is external to the database system and that is in communication with the database system via a network;
obtaining a link that enables access, via the network, to the first data stored in the second data storage;
storing the link in the data table; and
performing a deletion operation of the first data, in response to a request from the client device to delete the first data from the database system,
wherein the deletion operation comprises:
deleting the link from the data table without deleting the first data from the second data storage; and
storing the link in the deletion history table with a timestamp corresponding to a point in time when the link is deleted from the data table.

2. The method according to claim 1, further comprising:
receiving updated first data from the client device;
storing the updated first data in the second data storage;
obtaining an updated link that enables access, via the network, to the updated first data stored in the second data storage;
storing the updated link in the data table; and
performing the deletion operation of the first data.

3. The method according to claim 1, further comprising:
receiving second data including data relating to the first data; and
storing, in association with the first data, the second data in the data table,
wherein a data size of the second data is smaller than a specified threshold value and a data size of the first data is equal to or larger than the specified threshold value.

4. The method according to claim 1, further comprising:
receiving a data item to be stored in the database system;
in case a size of the received data item is equal to or larger than a specified threshold value,
storing the received data item in the second data storage as the first data,
obtaining and storing in the data table a link that enables access, via the network, to the received data item stored in the second data storage as the first data; and
in case a size of the received data item is less than the specified threshold value,
storing the received data item in the data table.

5. The method according to claim 4, wherein the first data includes binary large object, BLOB, data; and
wherein the link may be stored in a column of the data table, the column being assigned to a remote BLOB data type.

6. The method according to claim 5, wherein the first data storage comprises a main memory and at least one disk storage device; and/or
wherein the second data storage comprises cloud storage.

7. The method according to claim 3, further comprising:
deleting the first data from the second data storage based on:
a specified maximum retention time of backup data for the database system, and
the timestamp of the link stored in the deletion history table.

8. A non-transitory computer-readable medium comprising computer-readable instructions, which, when loaded and executed on a computing system, cause the computing system to:

receive, from a client device, first data to be stored in a database system;
store the first data in second data storage that is external to the database system and that is in communication with the at least one processor via a network;
obtain a link that enables access, via the network, to the first data stored in the second data storage;
store the link in the data table; and
perform a deletion operation of the first data, in response to a request from the client device to delete the first data from the database system,
wherein the deletion operation comprises:
deleting the link from the data table without deleting the first data from the second data storage; and
storing the link in the deletion history table with a timestamp corresponding to a point in time when the link is deleted from the data table.

9. The medium according to claim 8, wherein the computer-readable instructions, which, when loaded and executed on a computing system, cause the computing system to:
receive updated first data from the client device;
store the updated first data in the second data storage;
obtain an updated link that enables access, via the network, to the updated first data stored in the second data storage;
store the updated link in the data table; and
perform the deletion operation of the first data.

10. The medium according to claim 9, wherein the computer-readable instructions, which, when loaded and executed on a computing system, cause the computing system to:
receive second data including data relating to the first data; and
store, in association with the first data, the second data in the data table, wherein a data size of the second data is smaller than a specified threshold value and a data size of the first data is equal to or larger than the specified threshold value.

11. The medium according to claim 9, wherein the computer-readable instructions, which, when loaded and executed on a computing system, cause the computing system to:
receive a data item to be stored in the database system;
in case a size of the received data item is equal to or larger than a specified threshold value,
store the received data item in the second data storage as the first data,
obtain and store in the data table a link that enables access, via the network, to the received data item stored in the second data storage as the first data; and
in case a size of the received data item is less than the specified threshold value,
store the received data item in the data table.

12. The medium according to claim 11, wherein the first data includes binary large object, BLOB, data; and
wherein the link may be stored in a column of the data table, the column being assigned to a remote BLOB data type.

13. The medium according to claim 12, wherein the first data storage comprises a main memory and at least one disk storage device; and/or
wherein the second data storage comprises cloud storage.

14. A database system comprising:
at least one processor; and
first data storage that is coupled to the at least one processor and that is configured to store a data table and a deletion history table,
wherein the at least one processor is configured to:
  receive, from a client device, first data to be stored in the database system;
  store the first data in second data storage that is external to the database system and that is in communication with the at least one processor via a network;
  obtain a link that enables access, via the network, to the first data stored in the second data storage;
  store the link in the data table; and
  perform a deletion operation of the first data, in response to a request from the client device to delete the first data from the database system,
wherein the deletion operation comprises:
  deleting the link from the data table without deleting the first data from the second data storage; and
  storing the link in the deletion history table with a timestamp corresponding to a point in time when the link is deleted from the data table.

15. The database system according to claim 14, wherein the at least one processor is further configured to:
  receive updated first data from the client device;
  store the updated first data in the second data storage;
  obtain an updated link that enables access, via the network, to the updated first data stored in the second data storage;
  store the updated link in the data table; and
  perform the deletion operation of the first data.

16. The database system according to claim 15, wherein the at least one processor is further configured to:
  receive second data including data relating to the first data; and
  store, in association with the first data, the second data in the data table,
  wherein a data size of the second data is smaller than a specified threshold value and a data size of the first data is equal to or larger than the specified threshold value.

17. The database system according to claim 15, wherein the at least one processor is further configured to:
  receive a data item to be stored in the database system;
  in case a size of the received data item is equal to or larger than a specified threshold value,
    store the received data item in the second data storage as the first data,
    obtain and store in the data table a link that enables access, via the network, to the received data item stored in the second data storage as the first data; and
  in case a size of the received data item is less than the specified threshold value, store the received data item in the data table.

18. The database system according to claim 17, wherein the first data includes binary large object, BLOB, data; and
  wherein the link may be stored in a column of the data table, the column being assigned to a remote BLOB data type.

19. The database system according to claim 18, wherein the first data storage comprises a main memory and at least one disk storage device; and/or
  wherein the second data storage comprises cloud storage.

20. The database system according to claim 18, wherein the at least one processor is further configured to:
  delete the first data from the second data storage based on:
    a specified maximum retention time of backup data for the database system, and
    the timestamp of the link stored in the deletion history table.

* * * * *